(12) United States Patent
Kamihira

(10) Patent No.: US 6,397,113 B1
(45) Date of Patent: May 28, 2002

(54) INTEGRATED CONTROL SYSTEM

(75) Inventor: Ichikai Kamihira, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/309,841

(22) Filed: May 11, 1999

(30) Foreign Application Priority Data

May 14, 1998 (JP) .......................................... 10-132213

(51) Int. Cl.[7] ......................... G05B 13/02; G06F 15/18
(52) U.S. Cl. ............................ 700/47; 700/48; 700/50; 701/106; 706/13; 706/25
(58) Field of Search ............................. 700/86, 47, 48, 700/50, 51; 706/12, 13, 25; 701/98, 106

(56) References Cited

U.S. PATENT DOCUMENTS

| | | | |
|---|---|---|---|
| 5,748,847 A | * 5/1998 | Lo | 395/23 |
| 5,875,108 A | * 2/1999 | Hoffberg et al. | 364/146 |
| 6,032,139 A | * 2/2000 | Yamaguchi et al. | 706/13 |
| 6,064,996 A | * 5/2000 | Yamaguchi et al. | 706/13 |

FOREIGN PATENT DOCUMENTS

| | | |
|---|---|---|
| DE | 43 01 391 A1 | 8/1994 |
| DE | 196 43 884 A1 | 5/1998 |
| EP | 0 772 106 A1 | 5/1997 |
| GB | 2 307 566 A | 5/1997 |
| WO | WO 96/02025 | 1/1996 |

OTHER PUBLICATIONS

Masaki Inaba, et al., Adaptive Control Systems Switched by Control and Robust Performance Criteria, Proceedings of the 1996 IEEE Conference on Emerging Technologies and Factory Automation, vol. 2, Nov. 18, 1996, pp. 690–696.
Takemasa Arakawa, et al., Natural Motion Generation of Biped Locomotion Robot using Hierarchical Trajectory Generation Method Consisting of GA, EP Layers, Proceedings 1997 IEEE International Conference on Robotics and Automation, vol. 1, Apr. 20, 1997, pp. 211–126.

* cited by examiner

Primary Examiner—Paul P. Gordon
(74) Attorney, Agent, or Firm—Knobbe, Martens, Olson & Bear, LLP

(57) ABSTRACT

An integrated control system for a machine such as an engine. The machine is composed of plurality of components such as a throttle valve and a fuel injector. The control system has a plurality of control modules for controlling the respective components and finally controlling the machine through the control of the components. Each control module is associated with at least one parameter for controlling each component. The parameter is evolved under genetic algorithm so as to be adapted to at least one of a predetermined characteristic that is a target of the machine, a characteristic of a user who uses the machine, a using condition and an environmental condition of the machine.

6 Claims, 21 Drawing Sheets

INTEGRATED CONTROL SYSTEM

BACKGROUND OF THE INVENTION

1. Field of the Invention

This invention relates to an integrated control system and more particularly to an improved integrated control system that controls characteristics of the final controlled subject in a manner that a plurality of controlled subjects that have relevance to each other.

2. Description of Related Art

Conventionally, in order to conduct integrated control, control output is usually determined from various input information including operating conditions and using conditions. The conventional control system is operable on a simple function that represents the relationship between input and output if a characteristic of the controlled subject is linear. However, if the final controlled subject is, for example, an engine which has non-linear characteristics, no functional equations indicating the input-output relationship exist. Thus, control parameters are determined in advance by experimental processes and used for determining output from input.

However, if a controlled subject is diversified and highly-developed, the final controlled subject is generally controlled composed of a plurality of controlled subjects and is controlled by integratively controlling the plural controlled subjects. That is, the control parameters for each controlled subject must be determined to satisfy conditions that the mutual relationships of parameters of the respective controlled subjects are kept in an optimal state to obtain characteristic of the final controlled subject. It is difficult to determine these control parameters through experimental processes in view of time and labor.

Also, it is required to select an imaginary user of the product, which is a subject to be controlled (i.e., the final controlled subject), at a stage of design or a stage of setting process before shipping and then to design or set the product to be adapted to the user's characteristics (such as preference, skill and personality) and using conditions. However, due to multifariousness of the user's characteristics and using conditions, it is almost impossible to provide products that can satisfy all users so far.

It may be an idea that a product is to be re-settable by the user per se who will have bought it so as to be adapted to his or her characteristics and using conditions. As described above, however, such a product has a plurality of subjects to be controlled and the subjects have relevance to each other. It is quite difficult even for a highly educated expert in this field to reset the product in reserving optimal relationships of all control parameters of the subjects to be controlled.

It is, therefore, a principal object of this invention to provide an improved integrated control system.

It is another object of this invention to provide an integrated control system whereby control parameters of controlled subjects can be easily determined even though a plurality of mutually related subjects exist and then a final controlled subject is allowed to have characteristics that can be always adapted to characteristics of every user and/or using conditions.

SUMMARY OF THE INVENTION

In accordance with one aspect of this invention, a control system is for controlling performance of a machine used by a user. The machine is operable by causative signals. The performance of the machine is indicatable by indicative signals. The control system is provided with control modules programmed to output the causative signals when receiving pre-selected signals. The input-output relationship of each control module is regulated by at least one control parameter. Processing units are also provided that are programmed to output at least one control parameter to the respective control modules when receiving indicative signals from the machine. The input-output relationship of each processing unit is regulated by coefficients. Selection-signal generation units are further provided that are programmed to output selection signals when receiving interaction signals from the user and/or pre-set target values. Genetic algorithm units are still further provided that are programmed to select fitted coefficients based on the selection signals when using as genes the coefficients from the respective processing units. The selected fitted coefficients replace the coefficients used in the respective processing units to update the input-output relationships of the respective processing units. Thereby the input-output relationships of the respective control modules are updated.

In accordance with another aspect of this invention, a control system is for controlling performance of a machine used by a user. The machine is operable by causative signals outputted from control modules when the control modules receive pre-selected signals. The performance of the machine is indicatable by indicative signals. The input-output relationship of each control module is regulated by at least one control parameter. The control system is provided with processing units programmed to output at least one control parameter to the respective control modules when receiving indicative signals from the machine. The input-output relationship of each processing unit is regulated by coefficients. Selection-signal generation units are also provided that are programmed to output selection signals when receiving interaction signals from the user and/or pre-set target values. Genetic algorithm units are further provided that are programmed to select fitted coefficients based on the selection signals when using as genes the coefficients from the respective processing units. The selected fitted coefficients replace the coefficients used in the respective processing units to update the input-output relationships of the respective processing units. Thereby the input-output relationships of the respective control modules are updated.

BRIEF DESCRIPTION OF THE DRAWINGS

These and other features of the invention will now be described with reference to the drawings of preferred embodiments which are intended to illustrate and not to limit the invention, and in which:

FIG. 12(A) shows the drivability module and FIG. 12(B) shows the fuel efficiency module.

DETAILED DESCRIPTION OF THE PREFERRED EMBODIMENTS OF THE INVENTION

The integrated control system of this invention will now be described with reference to some preferred embodiments shown in the figures.

Outline of Integrated Control System (FIGS. 1 to 5)

Figure 1:
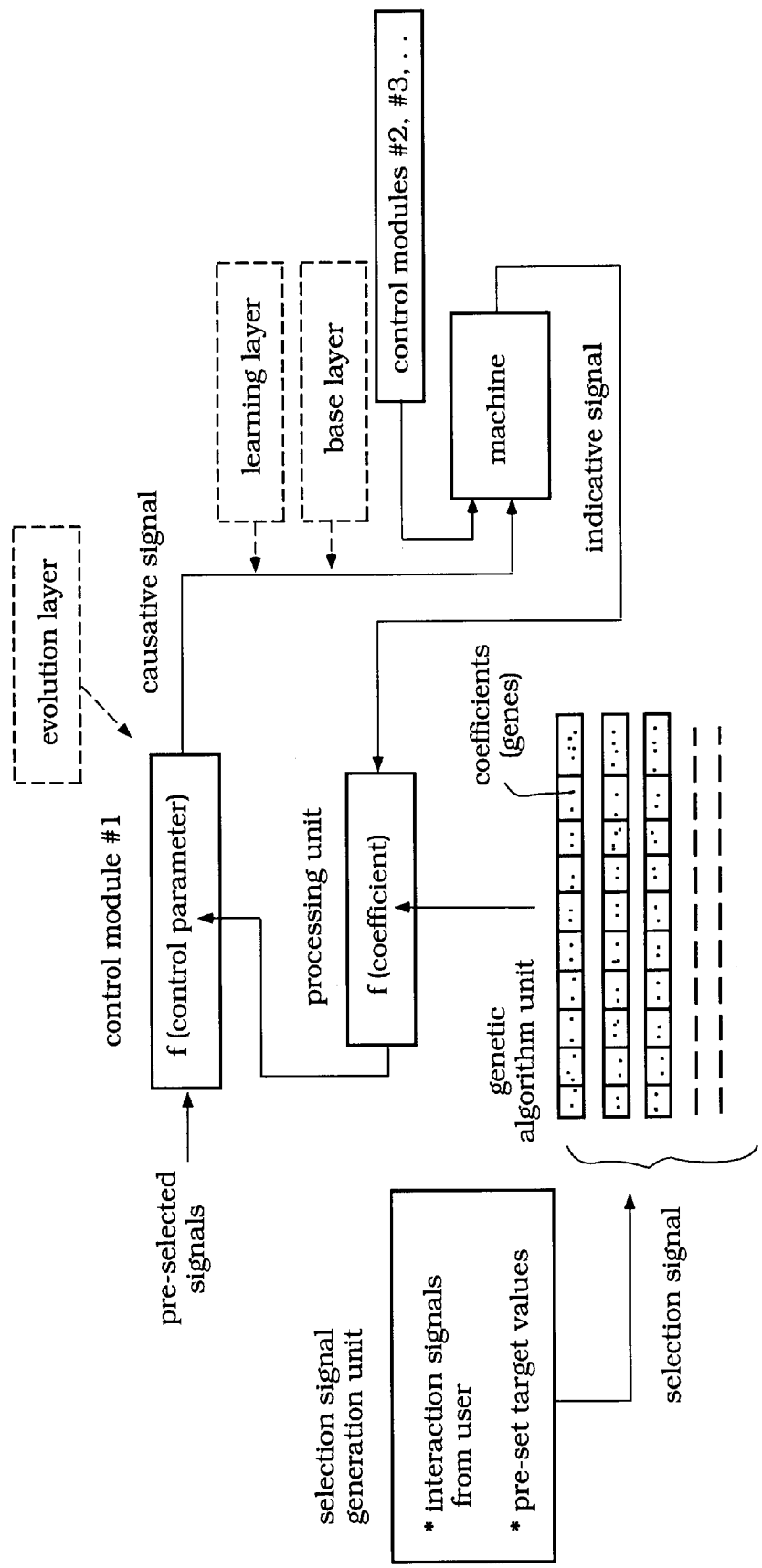
FIG. 1 is a block diagram showing schematically a basic principle of an embodiment of a control system according to this invention.

FIG. 1 is a schematic diagram illustrating an embodiment of the control system according to the present invention.

This control system is for controlling performance of a machine, which is a final controlled subject, used by a user. The machine is operable by causative signals, and the performance of the machine is indicatable by indicative signals. As shown in the figure, the control system comprises: (a) control modules programmed to output the causative signals when receiving per-selected signals, wherein the input-output relationship of each control module is regulated by at least one control parameter; (b) processing units programmed to output at least one control parameter to the respective control modules when receiving indicative signals from the machine, wherein the input-output relationship of each processing unit is regulated by coefficients; (c) selection-signal generation units programmed to output selection signals when receiving interaction signals from the user and/or pre-set target values; and (d) genetic algorithm units programmed to select fitted coefficients based on the selection signals when using as genes the coefficients from the respective processing units, wherein the selected fitted coefficients replace the coefficients used in the respective processing units to update the input-output relationships of the respective processing units, thereby updating the input-output relationships of the respective control modules.

In the above, the control modules can be grouped into interaction control modules and autonomous control modules, depending on whether the selection signals are derived from the interaction signals from the user or the pre-set target values. In the above embodiment, the interaction control modules can evolve in accordance with the user's response to the outputted performance of the machine, whereas the autonomous control modules can evolve to satisfy the pre-set target values. One practical example can be found in a vehicle engine wherein fuel efficiency can be improved autonomously (by using the autonomous control modules) whereas drivability can be improved in accordance with the user's response (by using the interaction control modules), thereby improving integratively the performance of the engine.

Further, the control modules can constitute an evolution layer, and the control system can further comprise a base layer downstream of the evolution layer and upstream of the machine. The base layer calculates and adds base values of the causative signals to the outputs from the control modules of the evolution layer, based on pre-selected signals. The base layer is not indispensable, but advantageous in preventing surges of the causative signal and stabilizing the performance. The base layer can be a conventional control module which constantly outputs signals based on calculation. In addition, the control system can further comprise a learning layer between the evolution layer and the base layer. The learning layer has a learning function which copies the input-output relationship of each control module and outputs causative signals to the base layer. The learning layer can be constituted by, for example, neural networks.

In one embodiment, the processing units include neural networks programmed to output the control parameters when receiving the indicative signals, the input-output relationships of which neural networks are regulated by coupling coefficients. In this embodiment, the coupling coefficients are used as genes at the genetic algorithm units.

Figure 2:
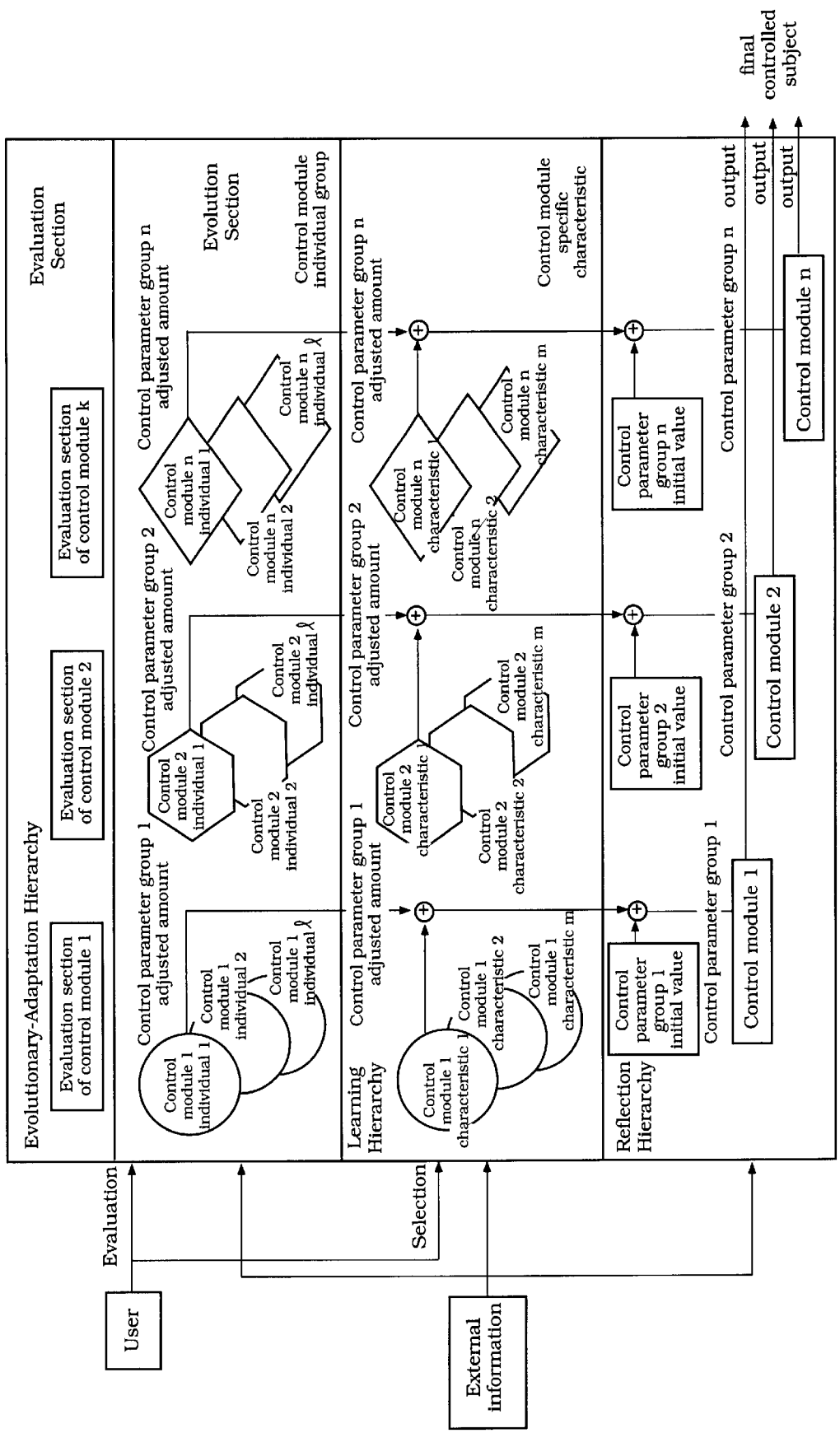
FIG. 2 is a block diagram showing schematically an overall outline of the control system.

FIG. 2 illustrates a block diagram showing schematically an overall outline of the control system.

As shown in this figure, the integrated control system comprises three hierarchies, i.e., a reflection hierarchy corresponding to the base layer, a learning hierarchy corresponding to the learning layer and an evolutionary-adaptation hierarchy corresponding to the evolutionary layer.

The reflection hierarchy has control modules 1 to n that determine operational amounts of respective measures which operate a plurality of components (controlled subjects) that are provided in the machine (a final controlled subject) based upon inputted external information such as using conditions and environmental conditions of the machine or components. The respective control modules 1 to n are composed of control elements installed with the relationships between the external conditions and the operational amounts of the respective measures in the forms of equations, maps, fuzzy rules, neural networks and/or subsumption architectures.

The evolutionary-adaptation hierarchy has control modules 1 to n to evolve control parameters 1 to n belonging to respective parameter groups that have relevance with inputs and outputs of the respective control modules 1 to n in the reflection hierarchy. The respective control modules 1 to n evolve under genetic algorithm in which inferior genes are screened by respective control module evaluation sections so as to be adapted to at least one of predetermined characteristics of the machine, characteristics of the user that uses the machine, using conditions and environmental conditions. Individuals 1 to l are allotted to respective control modules 1 to n, as chromosomes that have genes encoded with the parameters.

The learning hierarchy has control modules 1 to n corresponding to the respective control modules 1 to n in the evolutionary-adaptation hierarchy so as to be able to learn the respective evolution results in the control modules 1 to n of the evolutionary-adaptation hierarchy. Also, the learning hierarchy is constructed to be able to memorize past evolution results (characteristics 1 to m) in the evolutionary-adaptation hierarchy so that the user is allowed to select and use the past evolution results 1 to m.

The aforedescribed integrated control system parallelly or serially executes the evolutionary processes of the respective control modules 1 to n in the evolutionary-adaptation hierarchy.

Figure 3:
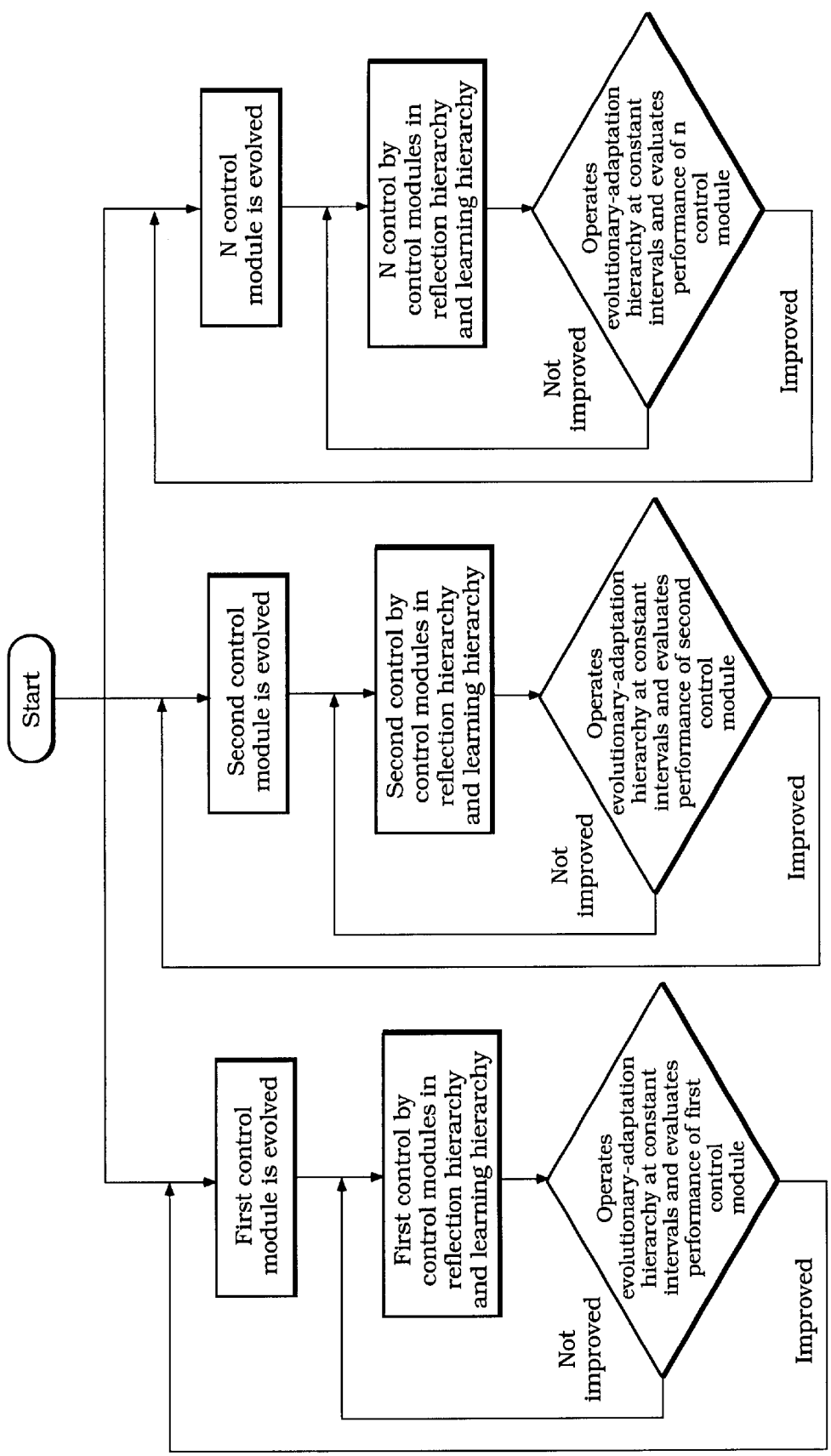
FIG. 3 is a flow chart showing a control routine in which evolutionary processes of respective control modules in an evolutionary-adaptation hierarchy are executed parallelly.

FIG. 3 illustrates a flow chart showing a control routine through which evolutionary processes of the respective control modules 1 to n in an evolutionary-adaptation hierarchy are executed parallelly. The evolutionary processes of the respective control modules 1 to n in this routine are executed independently of the processes of the other control modules.

After completion of the respective evolutionary processes, the evolved results are learned by the corresponding control modules 1 to n in the learning hierarchy. The respective control modules 1 to n then output adjusted amounts of the control parameters and the control modules 1 to n in the reflection hierarchy control the components of the machine by using the adjusted control parameters.

Also, after completion of the respective evolutionary processes, the respective control modules 1 to n in the evolutionary-adaptation hierarchy are repeatedly executed at constant intervals so as to be evaluated whether their performance is improved or not. If one or some of them are improved, the control modules 1 to n, which have obtained the improved performance, are again evolved.

Figure 4:
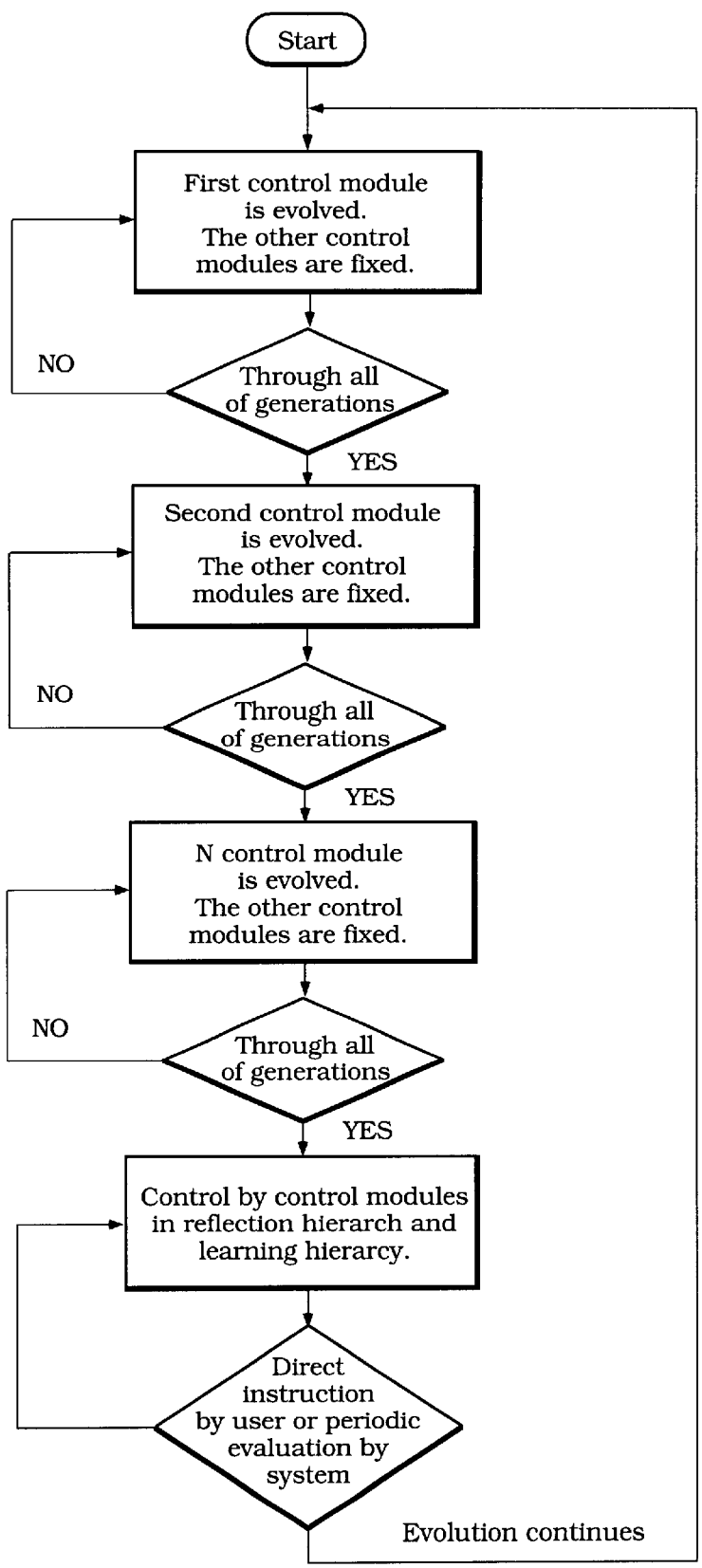
FIG. 4 is a flow chart showing another control routine in which evolutionary processes of respective control modules in an evolutionary-adaptation hierarchy proceed serially.

FIG. 4 illustrates a flow chart showing another control routine in which evolutionary processes of respective control modules 1 to n in an evolutionary-adaptation hierarchy are executed serially. The evolutionary processes of the respective control modules 1 to n in this routine are executed through predetermined generations in sequence. During the evolutionary processes executed on one of the control modules 1 to n, the other control modules are precluded from being executed with the evolutionary processes. Learning processes in the learning hierarchy can be executed either after every completion of evolutionary processes on the control modules 1 to n or after the final completion of the same on all of the control modules 1 to n. Anyhow, when reaching the goal of all evolutionary processes through the predetermined generations, the respective control modules 1 to n output adjusted amounts of control parameters. Then, the control modules 1 to n of the reflection hierarchy control the components of the machine by using the adjusted control parameters.

Also, when reaching the goal, the respective control modules 1 to n of the evolutionary-adaptation hierarchy are repeatedly executed at constant intervals so as to be evaluated whether their performance is improved or not. If improved, all of the control modules 1 to n are again evolved sequentially. This re-evolution, in one variation, may be started by an instruction of the user.

Figure 5:
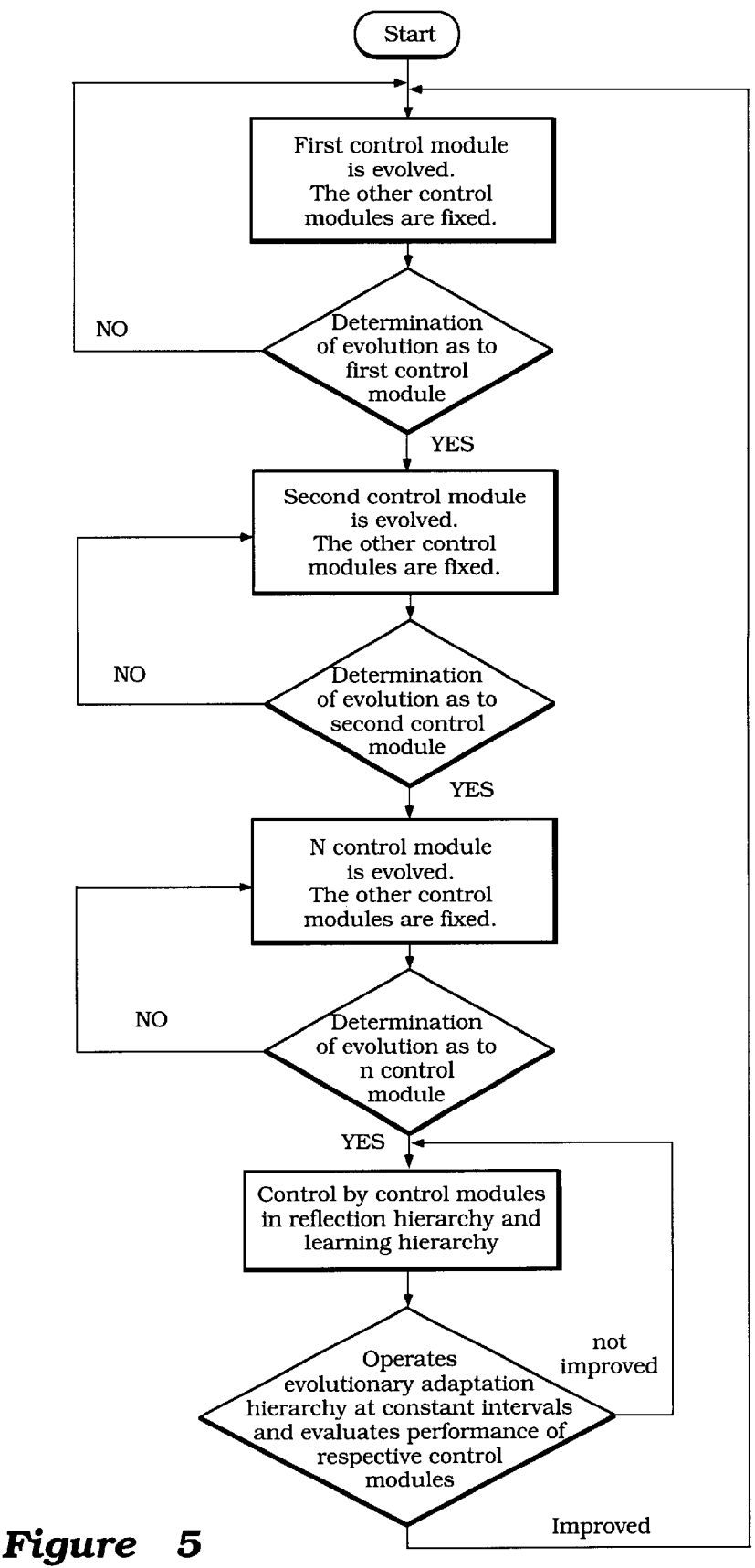
FIG. 5 is a flow chart showing alternative control routine in which evolutionary processes of respective control modules in an evolutionary-adaptation hierarchy are executed serially.

FIG. 5 illustrates a flow chart showing alternative control routine in which evolutionary processes of respective control modules 1 to n in an evolutionary-adaptation hierarchy are executed serially. The evolutionary processes of the respective control modules 1 to n in this routine are executed until the evolutionary processes of each control module converge. Whether the evolutionary processes may converge or not depends on whether the value or level obtained by the evolutionary processes reaches a predetermined value or level.

As described above, the control parameters of the respective control modules in the reflection hierarchy are evolved in the evolutionary-adaptation hierarchy so as to be adapted to at least one of predetermined characteristics of the machine, characteristics of the user associated with the machine, using conditions and environmental conditions. Thus, the machine can eventually obtain the total characteristics evolved in the evolutionary-adaptation hierarchy.

In addition, when evolutionary processes of respective control modules 1 to n in the evolutionary-adaptation hierarchy are executed parallelly as seen in FIG. 3, each evolution of these modules does not affect to each other. This parallel execution brings in diversification of improvements in performance.

On the other hand, when evolutionary processes of respective control modules 1 to n in the evolutionary-adaptation hierarchy are executed serially as seen in FIGS. 4 and 5, the direction of evolution depends on a control module that has evolved prior to the other control modules. Because of this, evolution can converge in relatively short time and hence optimal values can also be obtained quickly.

Figure 6:
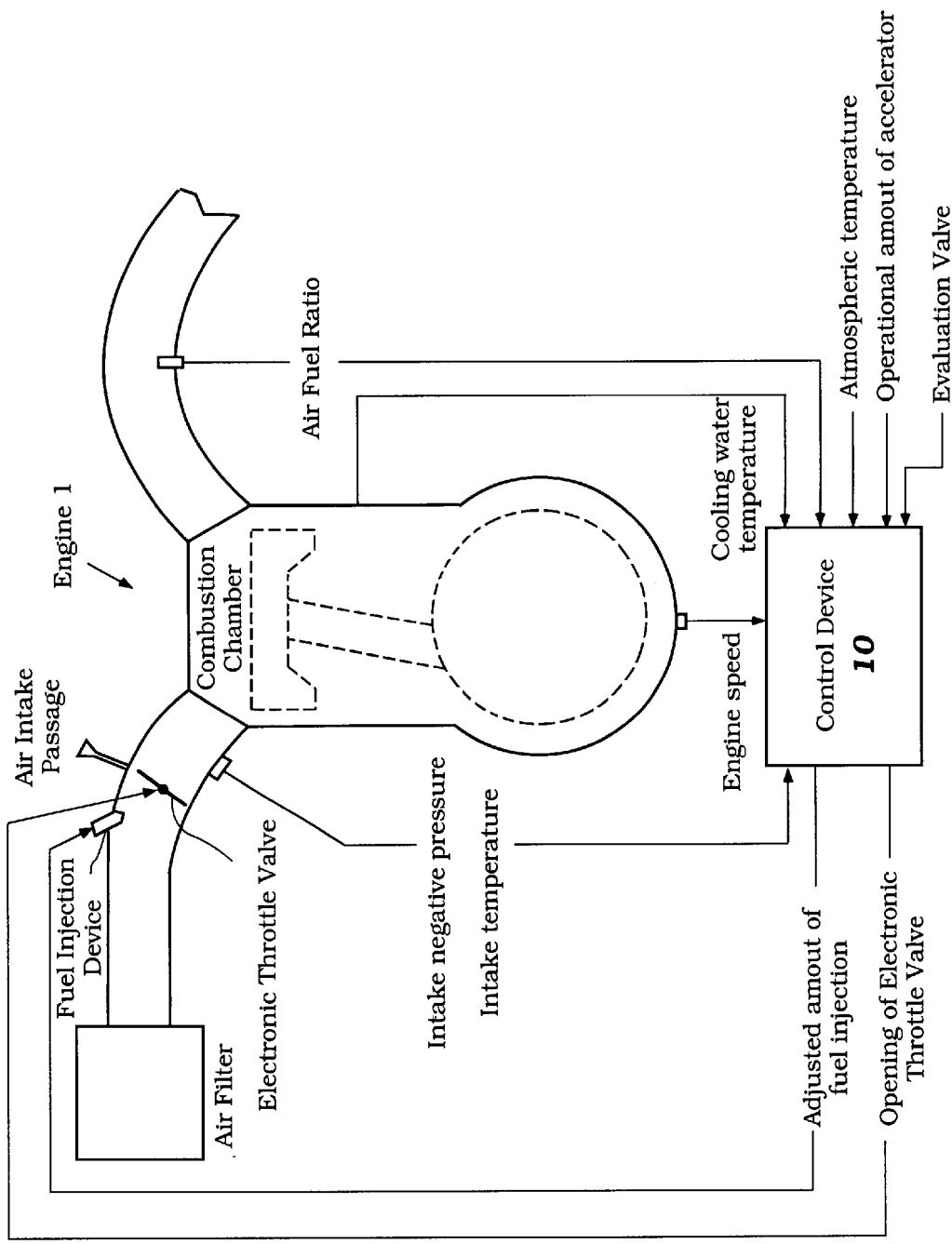
FIG. 6 is a schematic view showing the relationship between an engine and a control device performing the integrated control method for a vehicle.
Figure 7:
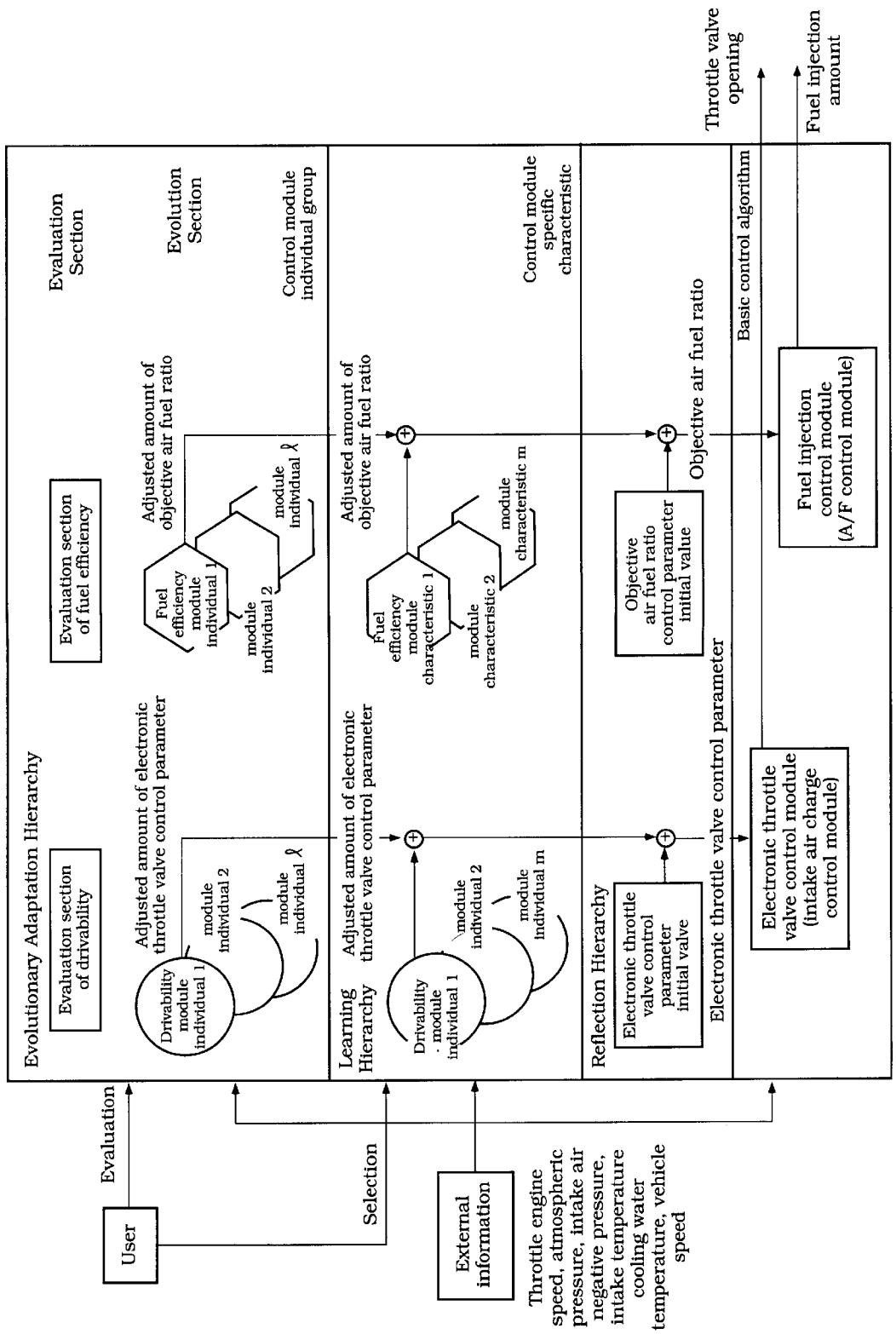
FIG. 7 is a block diagram showing schematically an overall outline of the control device that performs based upon the basic principle shown in FIG. 1.

Integrated Control System Applied to Engine of Vehicle (FIGS. 6 and 7)

A preferred embodiment wherein the integrated control system described above is applied to an engine of a vehicle will now be described hereunder.

FIG. 6 illustrates a schematic view showing the relationship between an engine 1 and a control device 10 performing the integrated control method for a vehicle.

The control device 10 is constructed to control the engine 1 integratively or synthetically in particularly aiming fuel efficiency and drivability, either of them is to be compatible with each other. The term "drivability" means response performance of engine outputs versus throttle operations. An air intake passage is provided and intake air charge is induced through the air intake passage for combustion with fuel injected in a combustion chamber.

As shown in FIG. 6, the control device 10 accepts inputted signals that relate to the information such as the engine speed, intake negative pressure, operational amounts of an accelerator, atmospheric pressure, temperature of intake air charge and temperature of cooling water.

The control device 10 accepts also signals regarding using conditions such as elapsed deterioration and frequency use. These signals are made in the control device 10 per se. For this purpose, the control device 10 has a clock pulse generator and a pulse counter therein. The signals relative to the elapsed deterioration and the frequency use can be obtained by counting the clock pulses and/or calculating with the number of pulses and the duration in a known manner.

Based upon the accepted signals, the control device 10 operates the fuel injector and the electronic throttle valve and eventually controls the engine 1 integratively or synthetically. In this integrated control, as aforenoted, the control device 10 particularly attempts to cope with both of the fuel efficiency and the drivability.

FIG. 7 illustrates a block diagram showing schematically an overall outline of the control device 10.

This control device 10 comprises the reflection hierarchy, the learning hierarchy and the evolutionary-adaptation hierarchy as described above.

Reflection Hierarchy Applied to Engine Control (FIGS. 7 to 11)

Figure 8:
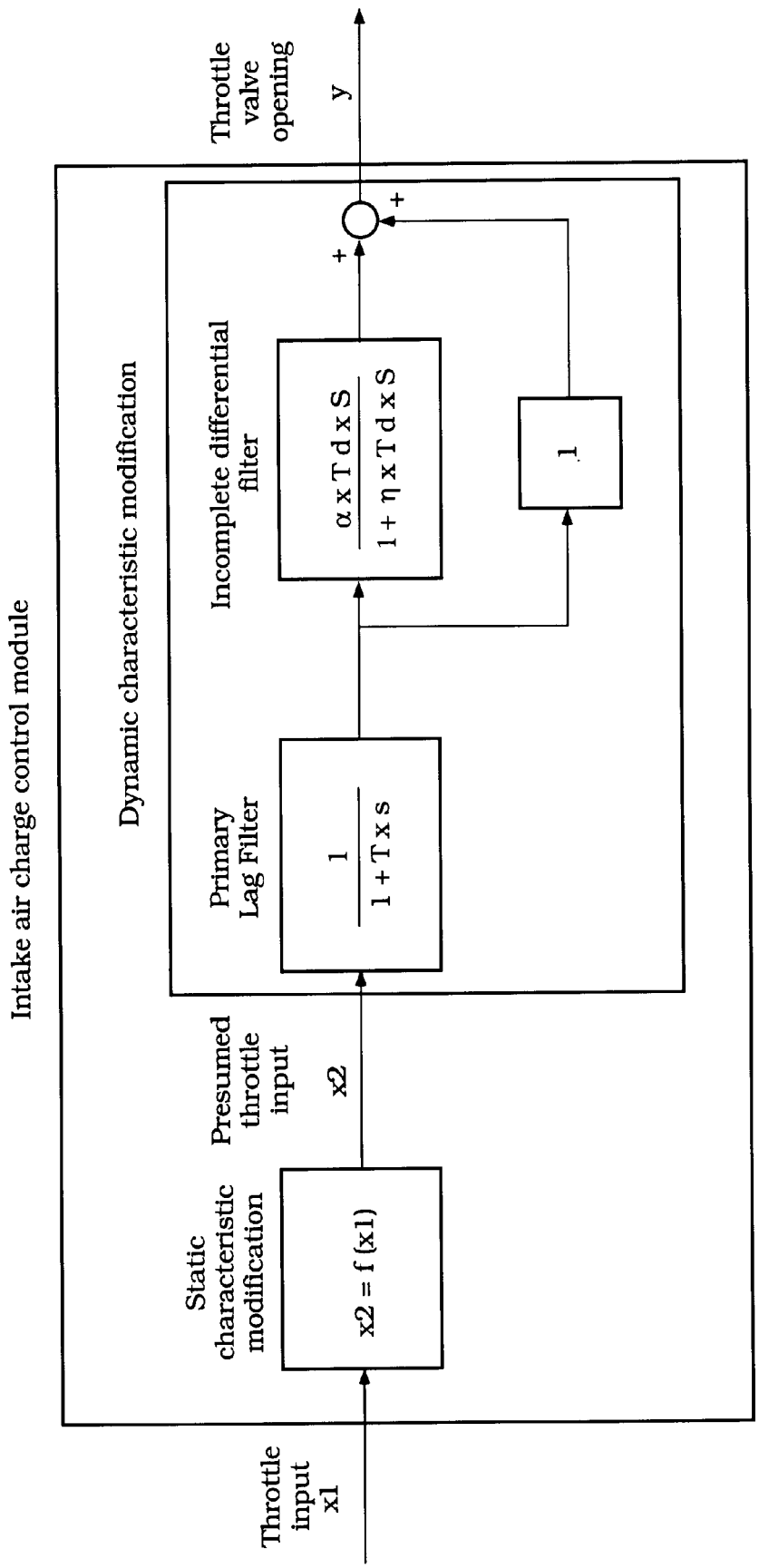
FIG. 8 is a block diagram showing a module for controlling intake air charge amounts.

As shown in FIG. 7, the reflection hierarchy has a module for controlling intake air charge amounts (hereunder referred to as "intake air charge amounts control module") and a module for controlling air fuel ratio (hereunder referred to as "A/F control module"). The air charge amount control module is, as seen in FIG. 8, the module that determines an opening of the electronic throttle valve based upon an operational amount of the accelerator. It should be noted that the term "operational amount(s) of the accelerator" includes either information of angles of the accelerator and information of change rates of the accelerator.

Figure 9:
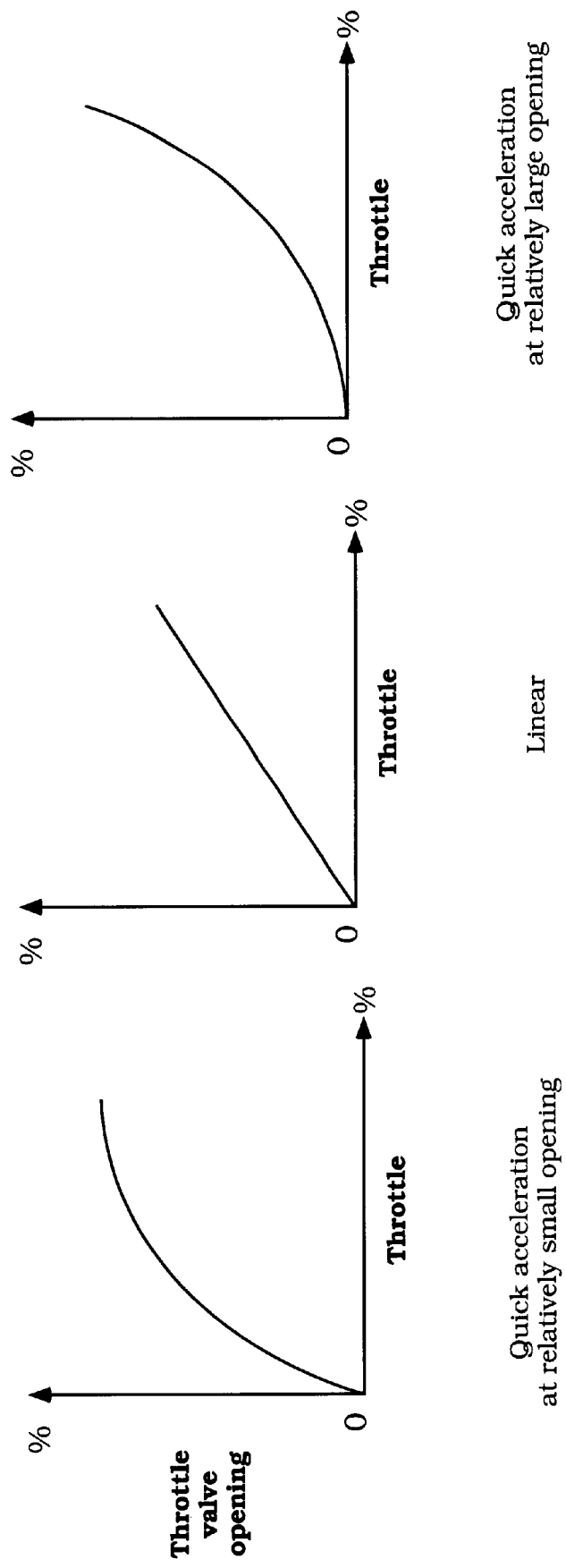
FIG. 9 is a graphical diagram showing some examples of static characteristics of throttle operational amounts versus throttle valve openings. The graph on the left hand shows the static characteristic that gives a quick acceleration at a relatively small opening. The graph at the middle position shows the static characteristic that is linear. The graph on the right hand shows the static characteristic that gives a quick acceleration at a relatively large opening.

The electronic throttle valve is allowed to have static characteristics and dynamic characteristics. The static characteristics are yielded from the relationships between the angles of the accelerator and the openings of the electronic throttle valve. FIG. 9 shows three examples of the static characteristics. The first example on the left hand indicates the static characteristic that gives a quick acceleration at a relatively small opening whereby the electronic throttle valve opens widely even though the angle of the accelerator is relatively small and then gradually converges to the totally open position with the accelerator angle going to large. The second example at the middle position indicates the static characteristic that is linear whereby the accelerator angle and the throttle opening are in proportion to each other. The third example on the right hand indicates the static characteristic that gives a quick acceleration at a relatively large opening whereby the throttle valve opens not very widely when the accelerator angle is small and then suddenly approaches to the totally open position with the accelerator angle going to large. Various types of static characteristics are adaptable if satisfying the condition that the throttle opening is going to be larger or continues to be constant with the accelerator angle going to large. Thus, the various static characteristics provide various control functions.

Meanwhile, the dynamic characteristics are yielded from change rates of the throttle valve opening versus change rates of the accelerator angle. The dynamic characteristics exert an influence on transitional characteristics of the vehicle. These dynamic characteristics, specifically, can be formed with primary lag and imperfect differentiation themselves or various combinations of them. Different combinations of them with each other provide different change rates of the throttle valve opening versus change rates of the accelerator angle.

Figure 10:
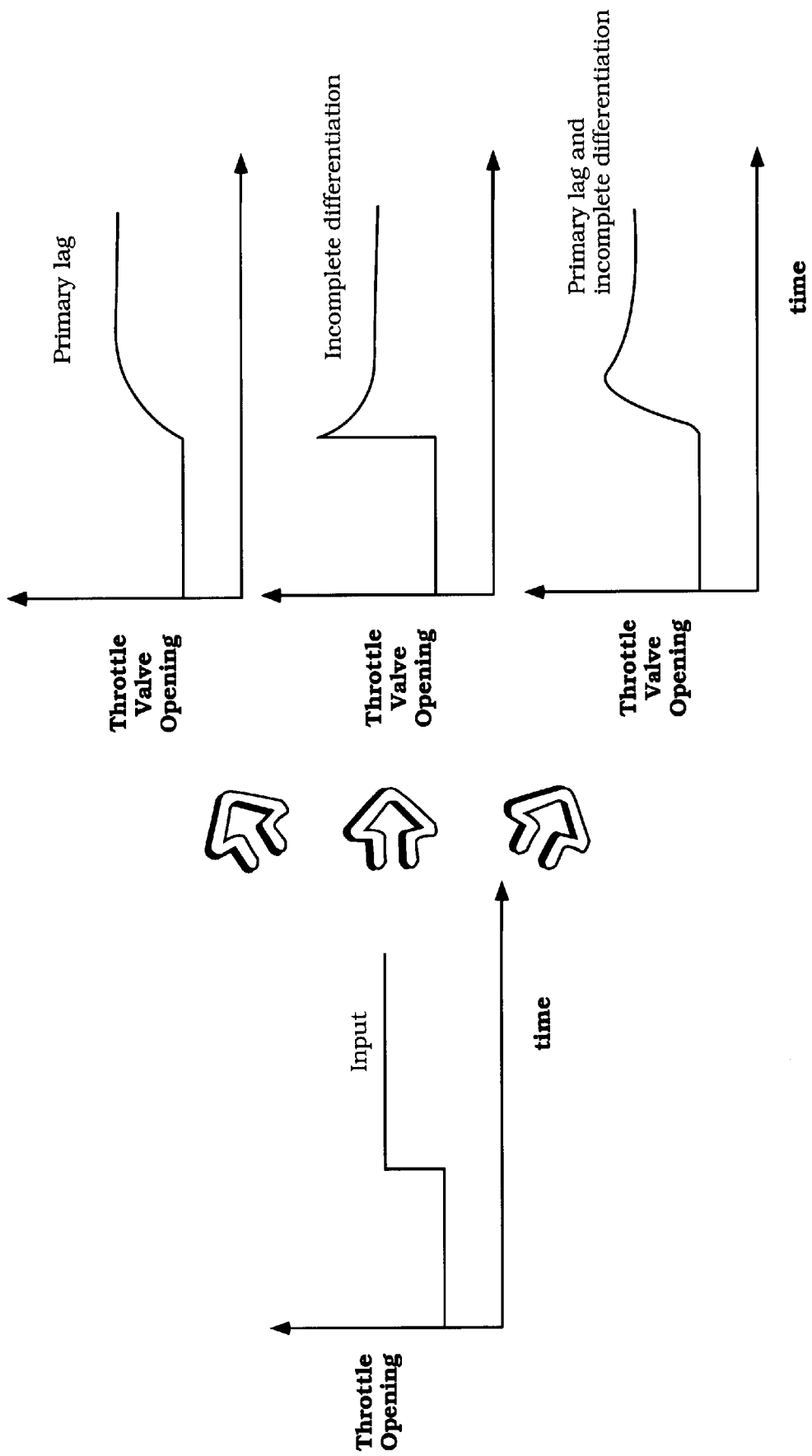
FIG. 10 is a graphical diagram showing some examples of dynamic characteristics of throttle operational amounts versus throttle valve openings. The graph on the left hand shows an input form and three graphs on the right hand show output forms of respective dynamic characteristics.

FIG. 10 shows three examples of the dynamic characteristics corresponding to an input form. The first example is a characteristic that has the primary lag and hence this characteristic can provide a relatively insensitive response. With this characteristic, the throttle valve gradually opens in response to the operation of the accelerator. The second example is a characteristic that has the imperfect differentiation and thus provides a quick response although generating a certain size of a spike. With this characteristic, the throttle valve quickly opens in response to the operation of the accelerator. The third example is a characteristic that has a combination of the primary lag with the imperfect differentiation. This characteristic provides a medium response speed between the first characteristic and the second characteristic. By combining the primary lag and the imperfect differentiation in different ways, various dynamic characteristics can be obtained.

Returning again to FIG. 8, the intake air charge amounts control module comprises a static characteristic modification section and a dynamic characteristic modification section that is sequentially connected to the static characteristic modification section. An actual operational amount $x_1$ of the accelerator, i.e., throttle, is inputted to the intake air charge amounts control module and modified to a presumed amount $x_2$ according to the static characteristic that has been previously set at the static characteristic modification section. The presumed amount $x_2$ is then supplied to the dynamic characteristic modification section and further modified therein to be outputted. The output y from the dynamic characteristic modification section will be used as an opening of the electronic throttle valve.

In FIG. 8, the other signs f, T, Td, $\alpha$ and $\eta$ indicates the static characteristic function, the time constant of the primary lag, the adjusted coefficient of acceleration and the differentiation (derivative) gain, respectively. The static characteristic function f, the time constant of the primary lag T, the adjusted coefficient of acceleration $\alpha$, the differentiation time Td and the differentiation (derivative) gain $\eta$ are changeable. However, in this embodiment, the user is permitted to chose a static characteristic function f from some stocked functions and the differentiation (derivative) gain $\eta$ is a fixed value. Under the conditions, the time constant of the primary lag T, the adjusted coefficient of acceleration $\alpha$ and the differentiation time Td will be evolved. The time constant of the primary lag T, the adjusted coefficient of acceleration $\alpha$ and the differentiation time Td will now be referred to as "the electronic throttle control parameters" as the general term hereunder.

Figure 11:
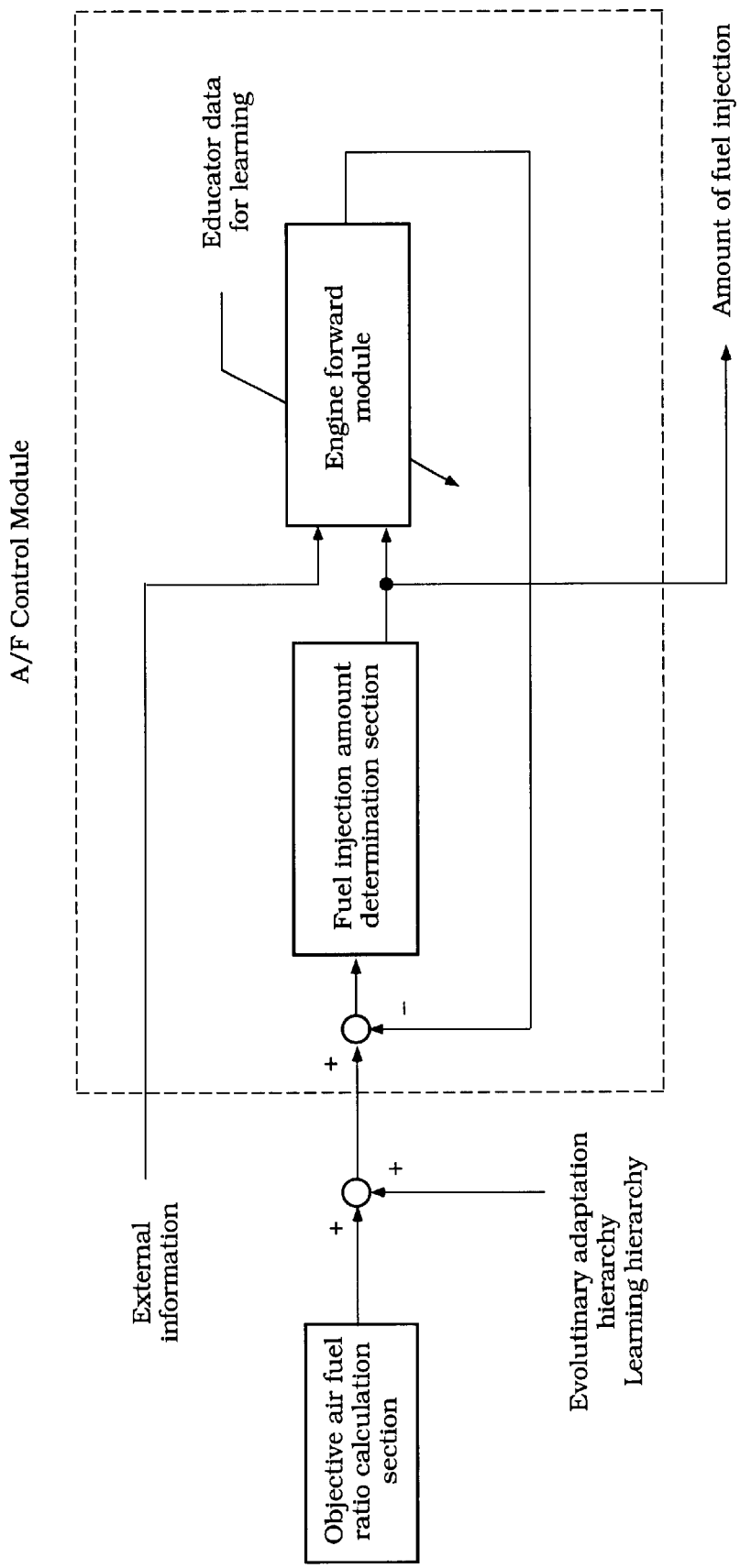
FIG. 11 is a block diagram of a module for controlling air fuel ratio.

The A/F control module comprises, as shown in FIG. 11, a forward model of the engine figured out by using a feed-forward control logic with a learning function and a fuel injection amounts determination section that determines a fuel amount injected from the fuel injector based upon the output from the engine forward model and a target air fuel ratio. The target air fuel ratio is given as follows. First, a target or air fuel ratio calculation section calculates a primary target air fuel ratio based upon the engine speed and the throttle valve opening. The output from the target air fuel calculation section is then adjusted by an adjusted amount obtained in the evolutionary-adaptation hierarchy and the learning hierarchy. This adjusted value is the target air fuel ratio.

Incidentally, initial values of the electronic throttle control parameters and also an initial value of the target air fuel ratio is given at the starting point.

Evolutionary-Adaptation Hierarchy Applied to Engine Control (FIGS. 7 and 12 to 17)

The evolutionary-adaptation hierarchy comprises an evolutionary-adaptation section and an evaluation section.

The evolutionary-adaptation section is separately provided with a drivability module relating to the intake air charge amount control module (electronic throttle control module) in the reflection hierarchy and the fuel efficiency module relating to the A/F control module (fuel injection control module) of the reflection hierarchy. The evaluation section comprises a couple of evaluation units and each unit is provided to each module so that the respective evolved results will be adapted to the user's characteristics, predetermined targets and/or environmental conditions when evolving the respective control modules in the evolutionary-adaptation hierarchy under genetic algorithm. The user s characteristics are, for example, preference, skill and feeling of the user. Also, the predetermined characteristics that is targets of the engine are, for example, a target fuel efficiency and a target air fuel ratio that are pre-set. The using conditions are, as described above, such as elapsed deterioration and frequency use. Further, the environmental conditions are, for example, weather including atmospheric temperature and situations of the road on which the vehicle runs.

Figure 12A:
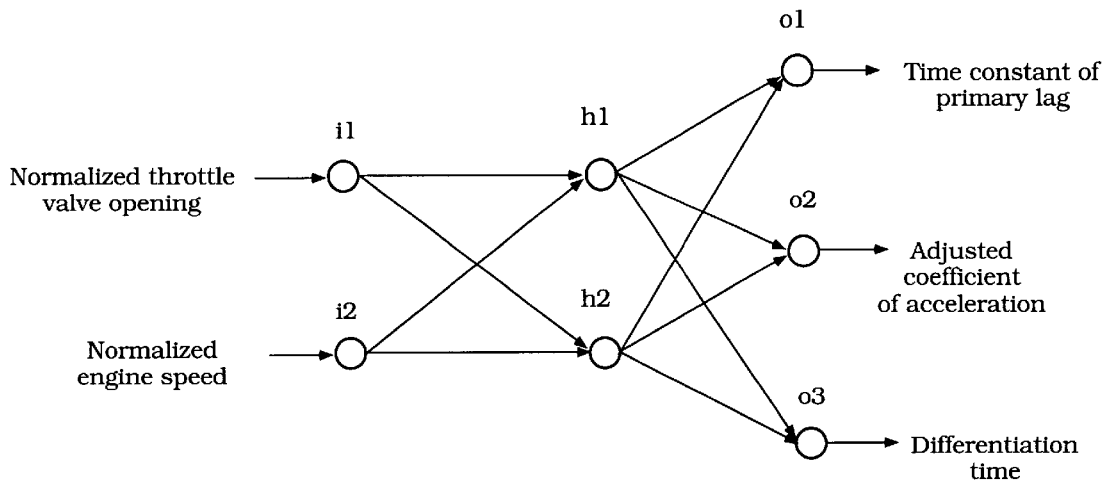
FIGS. 12A and 12B are schematic diagrams showing neural networks each forms a drivability module and a fuel efficiency module. More specifically.
Figure 12B:
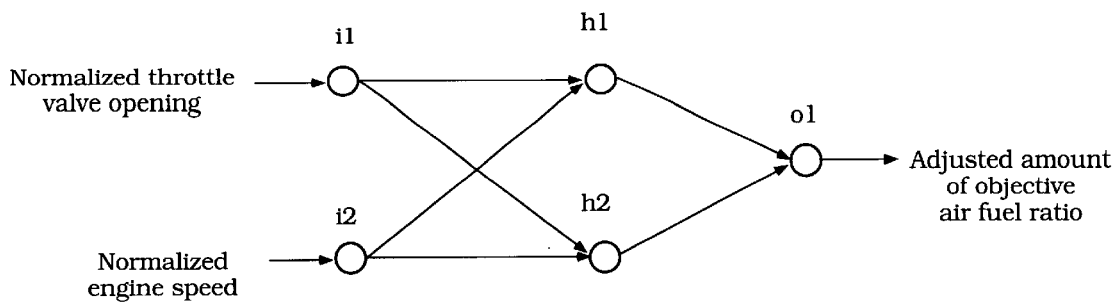

FIG. 12 illustrates the neural networks of the drivability module and the fuel efficiency module. The drivability module shown in FIG. 12(a) is a two-input and three-output neural network. A normalized throttle valve opening and a normalized engine speed are supplied to this neural network as the input information. While the outputs from this neural network are the adjusted amount of the time constant of the primary lag, the adjusted coefficient of acceleration and the differentiation time that will be supplied to the reflection hierarchy. The fuel efficiency module shown in FIG. 12(b) is a two-input and one-output neural network. In the same way as described with the drivability module, the normalized throttle valve opening and the normalized engine speed are supplied to this neural network as the input information. While the output from this neural network is the adjusted amount of the target air fuel ratio that will be supplied also to the reflection hierarchy. The normalized throttle valve opening used here is the information signal that is obtained by normalizing the output from the air charge amounts control module.

It should be noted that the normalized throttle valve opening is not only the output of the A/F control module but also the input of the neural network.

It should be also noted that, although only the throttle opening and the engine speed are applied as input information in this embodiment, other conditions or characteristics such as external conditions (environmental temperature etc.) can be also applied.

The evolutionary-adaptation hierarchy creates multiple chromosomes (individuals) by encoding coupling coefficients of the neural networks that form the respective control modules in this evolutionary-adaptation hierarchy, as genes. The created individuals are screened in accordance with the evaluation made by the evaluation section. Unscreened individuals are then used for creating individuals of the next generation by the way of "cross-over" and again screened. The evolutionary-adaptation hierarchy repeats this routine and eventually evolves the respective control modules therein in light of the evaluation of the evaluation section.

The evolutionary processes will now be described more in detail.

Figure 13:
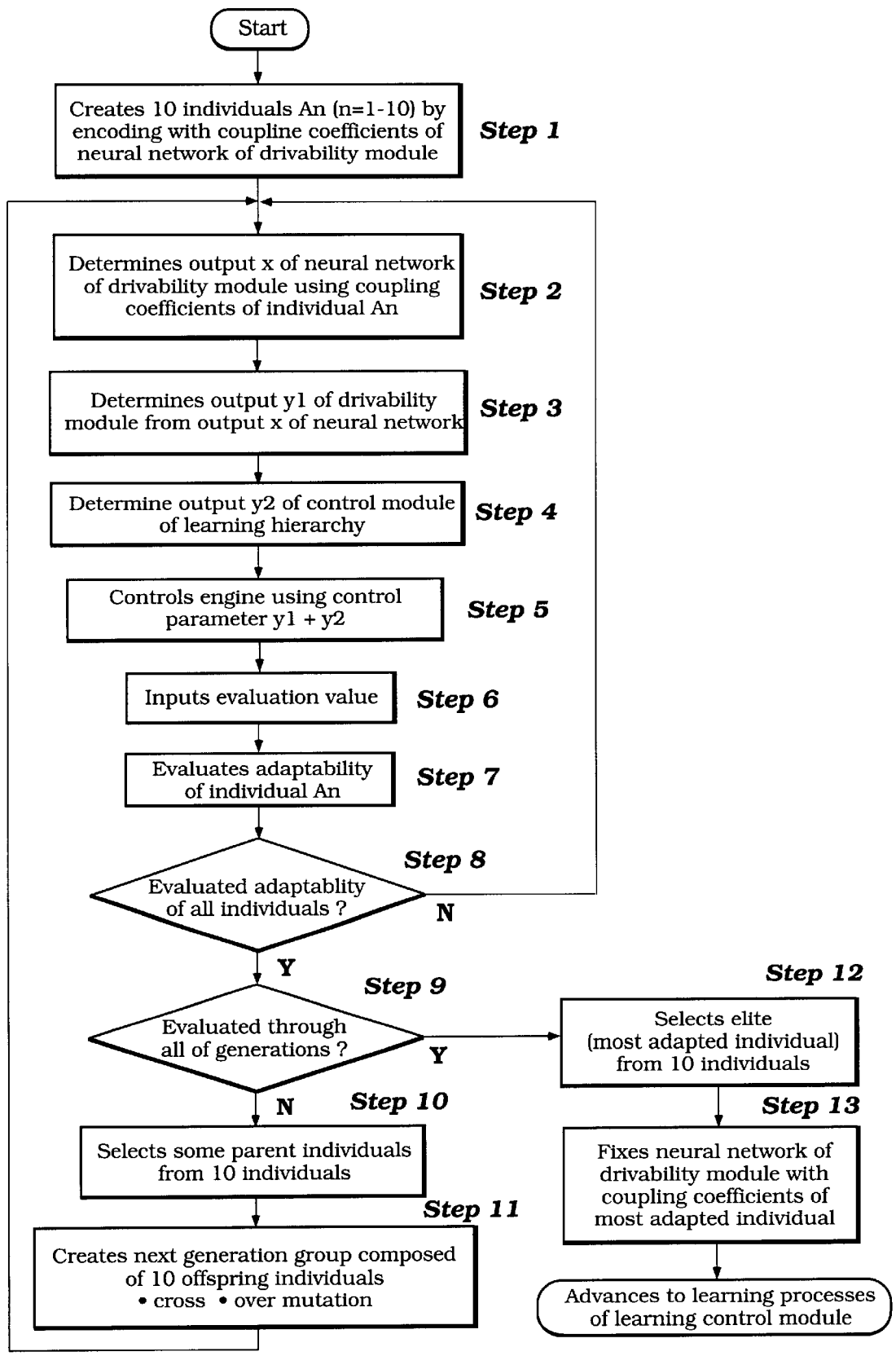
FIG. 13 is a flow chart showing evolutionary processes of the drivability module under genetic algorithm.

FIG. 13 illustrates a flow chart that shows the evolutionary processes of the drivability module.

Figure 14:
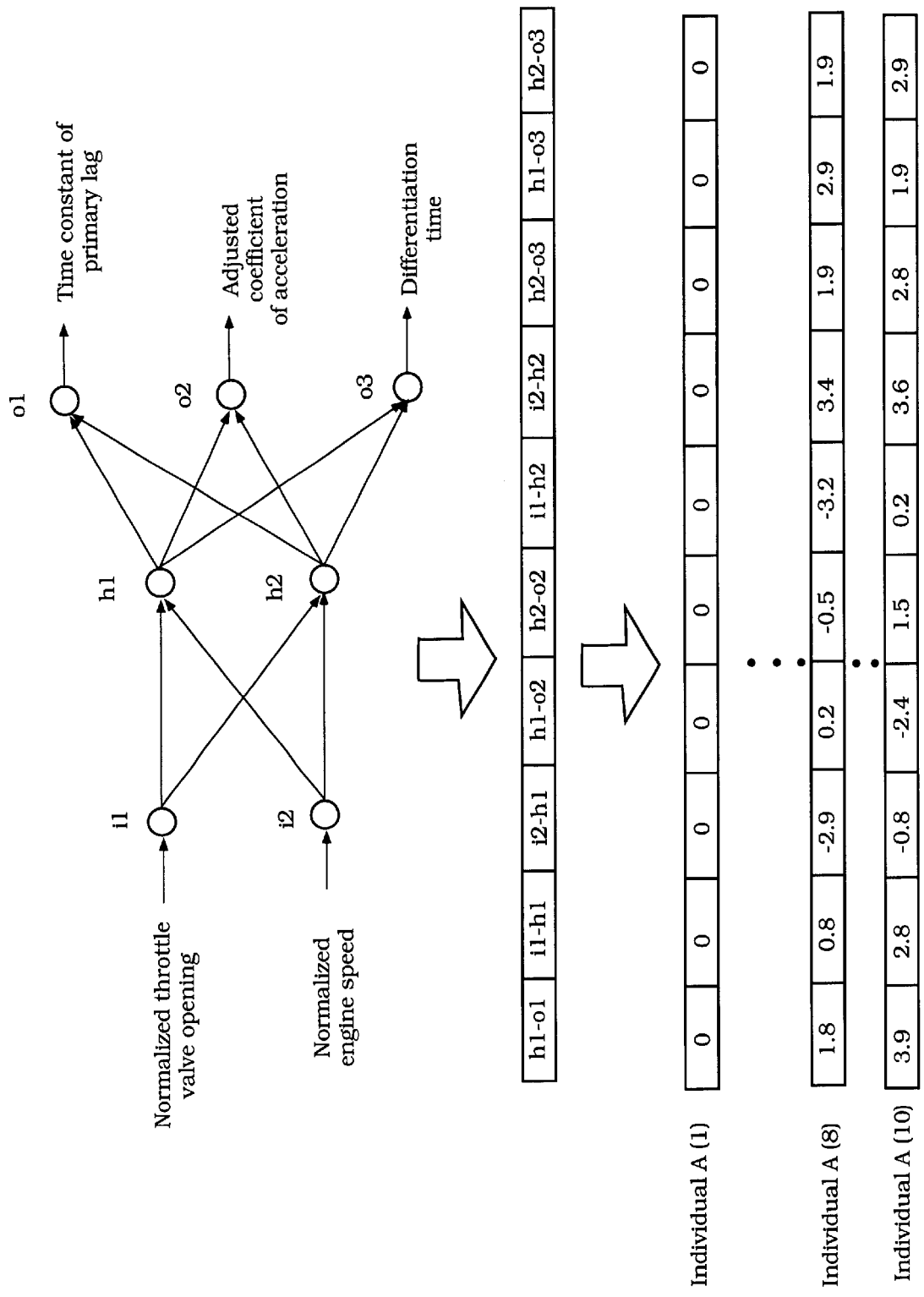
FIG. 14 is a schematic diagram showing the neural network of the drivability module, an encoding process wherein a first generation is created, which comprises multiple individuals encoded by coupling coefficients, used as genes, of the neural network and the encoded individuals.

The program starts and then goes to the step 1. First, at this step 1, as seen in FIG. 14, a first generation is created, which is composed of multiple individuals A(n) (n=1–10, ten individuals are created in this embodiment). The individuals are encoded with the coupling coefficients of the neural network that forms the drivability module, as genes. Initial values of the genes, i.e., the coupling coefficients, of each individual are randomly given in a predetermined range (e.g., approximately –10 to 10). Additionally, if the learning hierarchy has learned something and outputted results of the learning processes, it is useful to create one individual (e.g., the individual A(1) in FIG. 14) having genes that can make the output of the evolutionary-adaptation hierarchy zero. Because, even though the number of individuals are limited, diversity of the individuals that belong to the group in the evolutionary processes can be preserved without jeopardizing the performance obtained at the very point of time.

Next, the program goes to the step 2. The coupling coefficients of the neural network of the drivability module are fixed at the coupling coefficients, i.e., genes of one individual A(n), e.g., the individual A(1), created at the step 1 so that the output x of the neural network is determined, that corresponds to the actual input information, i.e., the normalized engine speed and throttle valve opening. The term "output x" is the general term indicating the outputs that are the time constant of the primary lag, adjusted coefficient of acceleration and differentiation time and will be used hereunder for making descriptions simpler.

The program, then, goes to the step 3. The output y1, corresponding to the individual A(n), of the drivability module, i.e., the adjusted amounts of the electronic throttle valve control parameters, is determined by linear transformation of the output x using the equation below. Wherein, G is the output gain of the evolutionary-adaptation hierarchy. In addition, the term "output y1" is used under the similar meaning as explained of the term "output x".

$$y1 = 2 \times Gx - G \tag{1}$$

By linear transformation of the output x of the neural network, the output y1 from the drivability module does not become extremely high. This means that the evolution gradually progresses as a whole. That is, extreme changes in engine behavior due to the evolution are prevented.

Now, the program goes to the steps 4 and 5. At this step, the output y2 of the learning hierarchy is determined using the same equation (!) in which, however, y1 is changed to y2. (step 4). The term "output y2" is used under the similar meaning as explained of the terms "output x" and "output y1". Then, this output y2 is added to the output y1 of the drivability module to make the adjusted amount Yn. The electronic throttle valve control parameters of the intake air charge amounts control module in the reflection hierarchy are adjusted with the adjusted amount Yn and then the engine is operated under this condition. That is, the vehicle accommodating this engine is now actually run.

Then, the program goes to the step 6. The process at this step is executed in the evaluation section. The user of the vehicle inputs his or her evaluation on the individual A(1). For this purpose, a button or other measures that can be operated by the user during driving the vehicle is provided (the button will represent these measures hereunder). The evaluation value is determined based upon, for example, the length of time wherein the user continues pressing the button. The length of time means a degree of the evaluation by the user. The longer the time, the more the user dislikes the individual.

The program, then, goes to the step 7. The process in this step is executed also in the evaluation section. The evaluation value on the individual A(1) is determined in this step. There are various ways for calculating this value. However, preferable ways are, for example, a way in which a reciprocal of the length of time is multiplied by a certain coefficient and another way in which a fuzzy rule based upon the length of time is used. The evaluation value calculated by these ways is almost accurate even though the user gives indistinct evaluation. It is also an applicable way in which, if the user continues to press the button all the time over certain duration, the individuals under evaluation during this time of period are screened. The last way allows the user to screen individual which he or she does not prefer. Thus, the individual cannot affect the next generation and prompt evolution is realized.

Next, the program goes to the step 8 and the processes at the steps 2 to 7 are repeatedly executed for the other individuals created in the step 1 until all of the individuals are evaluated.

It should be noted that the evolutionary processes at steps 2 to 8 are executed interactively, i.e., with an external operation such as that the user presses a button.

When determined that the evaluation on all individuals is completed, then the program goes to the step 9 and determines whether the evolution and the evaluation have executed through all of predetermined generations.

If this is negative, i.e., the evolution and evaluation have not reached to the final generation that is predetermined, the program goes to the step 10 and parent individuals are selected from the ten individuals created in the step 1 to create the next generation. The program employs the roulette-type selection method for this selection process. That is, the parent individuals are stochastically selected based upon the probability correlated to the adaptability of each individual. In this process, if the alternation of generations were strictly performed, even highly evaluated individuals might be destroyed. In order to prevent this undesired destruction, an elite reserve strategy is also employed, wherein an elite (highly evaluated individual) is permitted to remain alive unconditionally. In addition, the adaptability is linearly transformed to maintain the ratio of the maximum adaptability to the average in a group consisting of multiple individuals.

After selecting parent individuals, then the program goes to the step 11. In this step, cross-over is performed using the selected individuals as parent individuals to create a second generation composed of other ten offsprings (children). The cross-over performed between individuals may be the single-point crass-over, double-point cross-over or normal distribution cross-over.

The normal distribution cross-over is a method of creating offsprings based upon a rotation-symmetrical normal distribution with respect to an axis connecting the parents, using chromosomes expressed by the actual number (individuals). The standard deviation of the normal distribution is correlated with the distance between the parents in terms of the components in the direction of the main axis connecting the parents. Other components of the axis are made correlated with the distance between the line connecting the parents and a third parent sampled from the group. This cross-over method has an advantage that the characteristics of the parents are easily passed on to their offsprings.

In the step 11, mutation of genes is also caused in the created ten offsprings by randomly changing the gene values (the degree of coupling) at a given probability. One of the ten offsprings has genes that can make the output from the evolutionary-adaptation hierarchy zero.

After creating the second generation through the processes described above, the program repeats the steps 2 to 11 until all of the given generations are evolved and evaluated. During these repeated evolutionary processes, offspring individuals forming each generation are screened under the evaluation of the evaluation section, i.e., based upon preference of the user (including other conditions) and then create the next generation. Because of this, relationships between the input and the output of the drivability module evolve toward the preference of the user step by step.

Whether all of the given generations are evolved and evaluated is determined in the step 9 as described above. If the determination is positive, i.e., the generation is final one, then the program goes to the step 12. An individual having the highest adaptability (most adaptable individual), i.e., an elite, is selected from the ten offsprings of the generation.

After that, the program goes to the step 13. In this step, the coupling coefficients of the neural network of the drivability module are fixed at the genes possessed by the most adaptable individual.

Now, the evolutionary processes of the drivability module end and finally the program goes to learning processes of a learning control module in the learning hierarchy that will be described more in detail later.

Evolutionary processes on the fuel efficiency module in the evolutionary-adaptation hierarchy will now be described hereunder.

Figure 15:
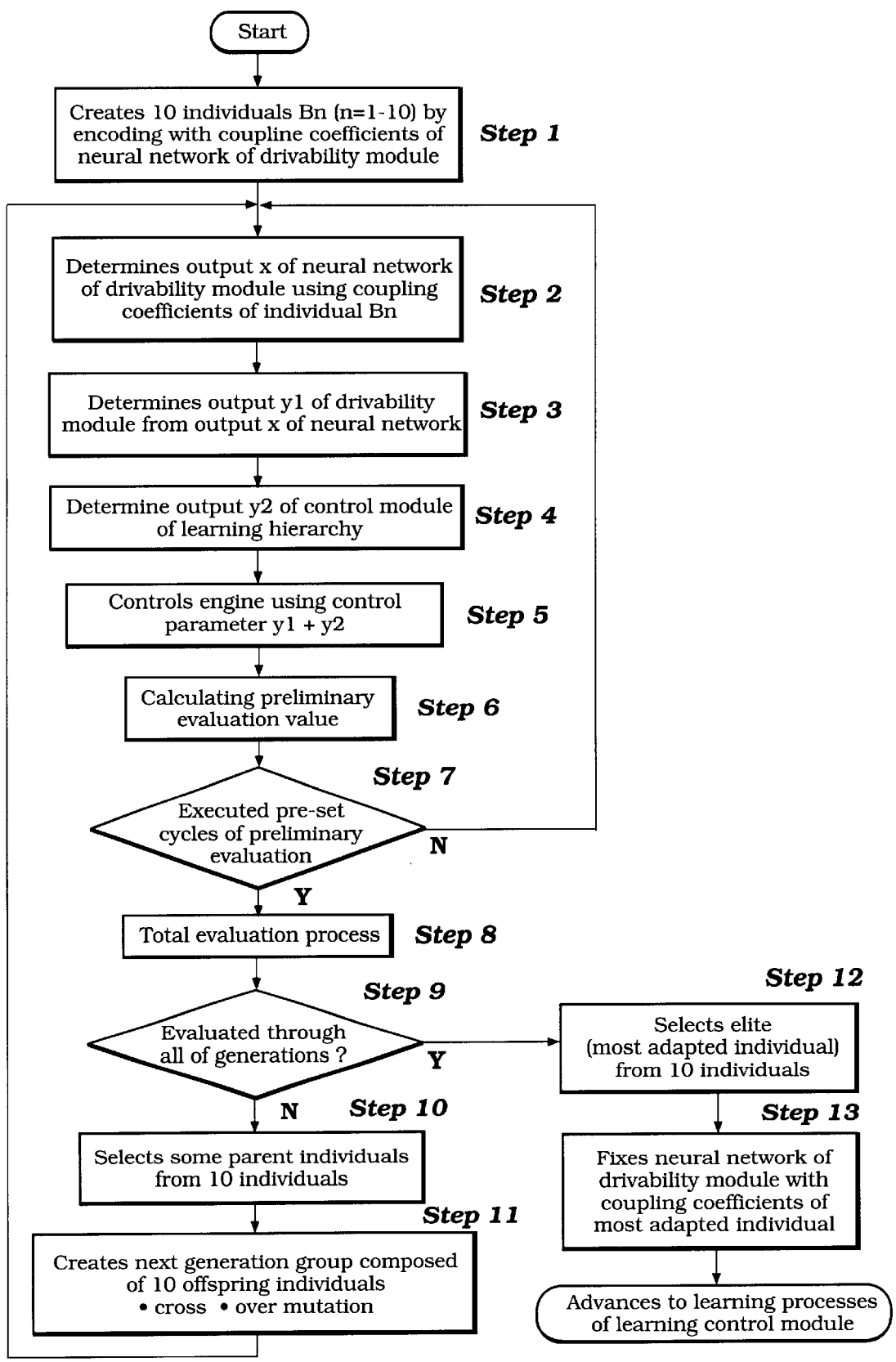
FIG. 15 is a flow chart showing evolutionary processes of the fuel efficiency module under genetic algorithm.

FIG. 15 illustrates a flow chart that shows the evolutionary processes of the fuel efficiency module under genetic algorithm.

Figure 16:
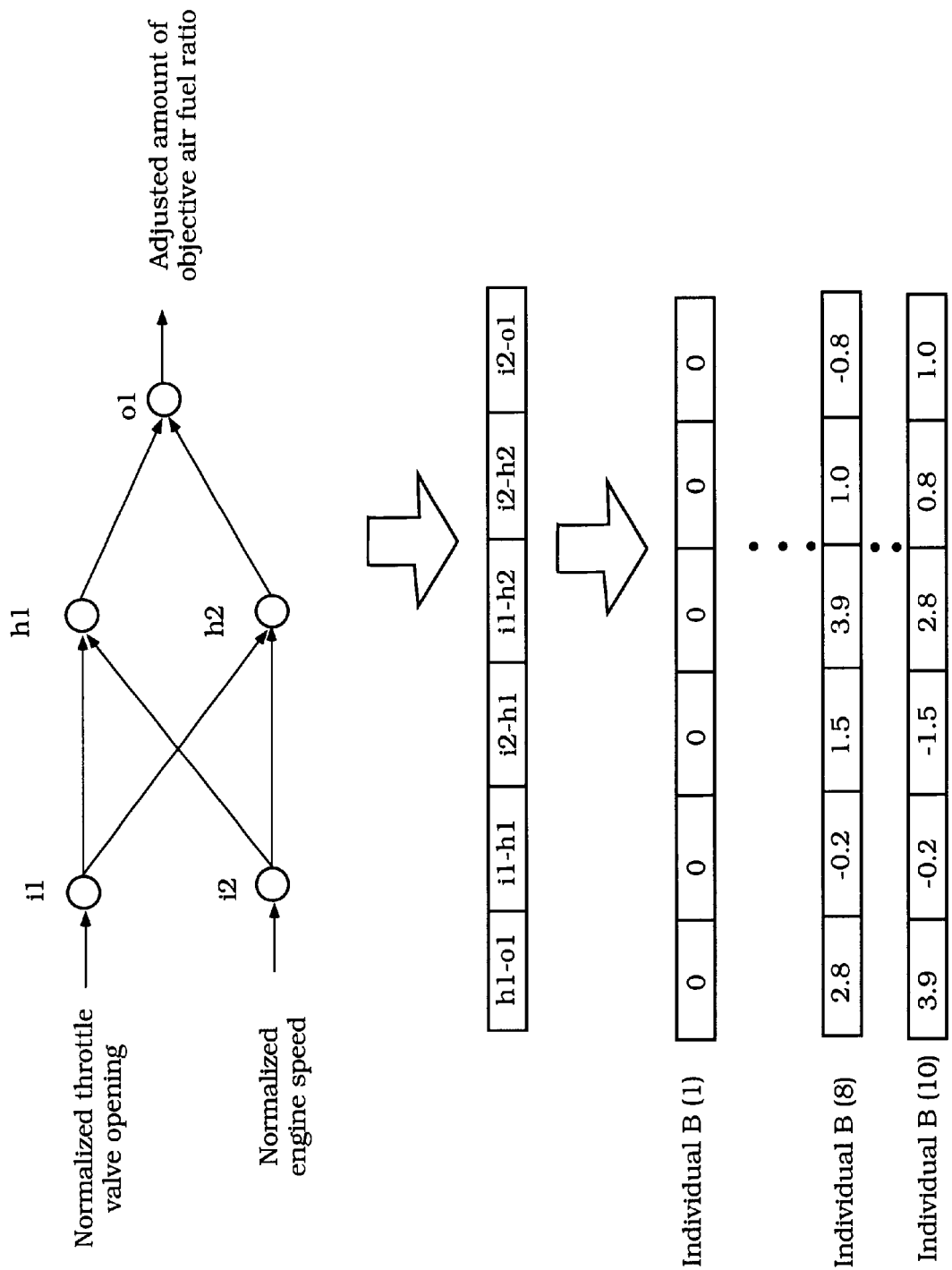
FIG. 16 is a schematic diagram showing the neural network of the fuel efficiency module, an encoding process wherein a first generation is created, which comprises multiple individuals encoded by coupling coefficients, used as genes, of the neural network and the encoded individuals.

First, as seen in FIG. 16, a first generation is created, which is composed of multiple individuals B(n) (n=1–10, ten individuals are created in this embodiment) (step 1).

Next, in the same manner as described in the evolutionary processes of the drivability module, an adjusted amount Yn, which is made when y1 that is an output of the fuel efficiency module and y2 that is an output of the learning hierarchy are added up. This adjusted amount Yn is, in the other definition, an adjusted amount of the target air and fuel ratio in the reflection hierarchy. By using a new target value which is added with the adjusted amount Yn (at the starting point, an initial target value was given), the A/F control module is now employed for actual control of the engine (steps 2 to step 5) and then calculated a result as a preliminary evaluation value (step 6).

Figure 17:
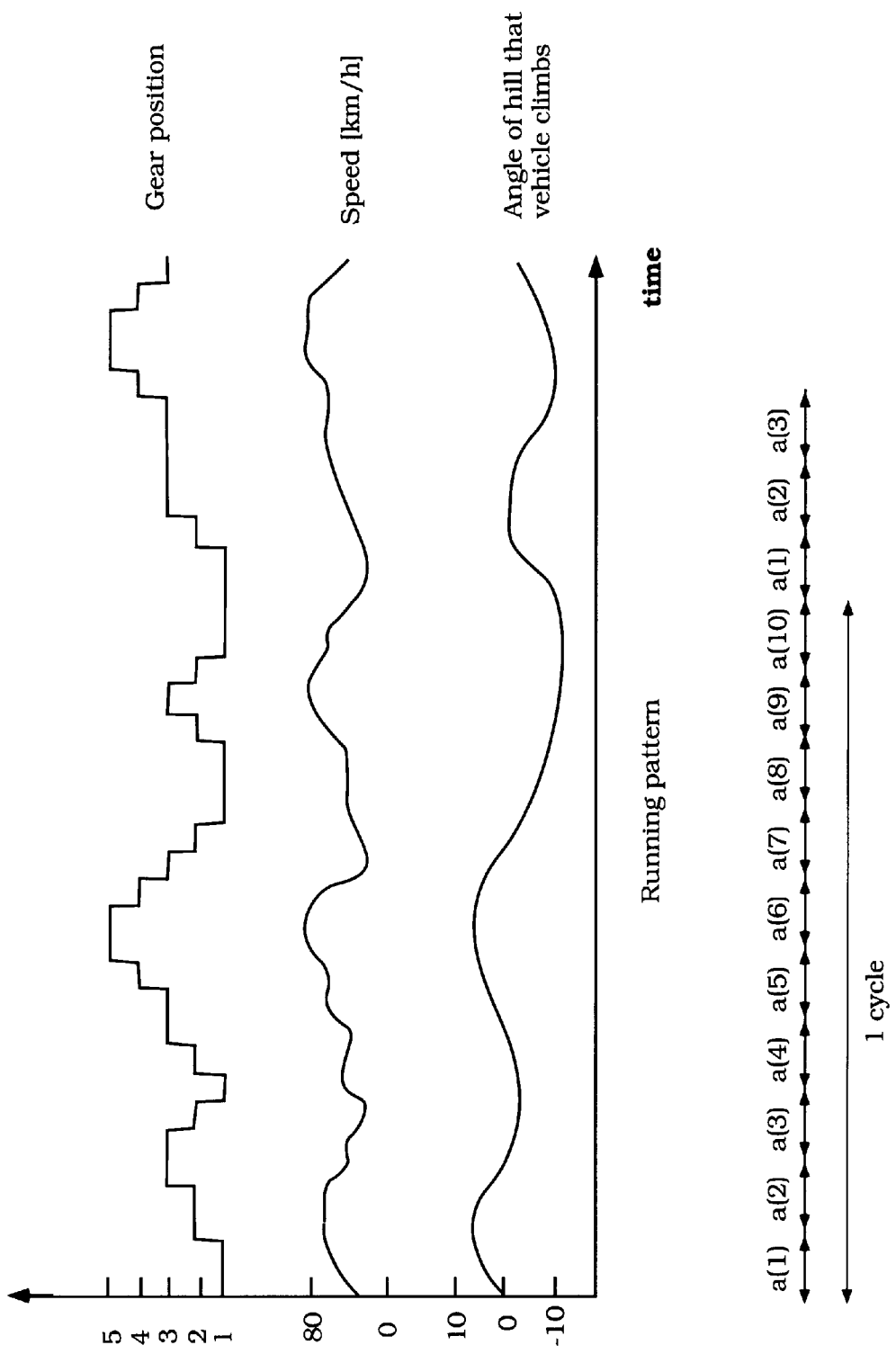
FIG. 17 is a graphical diagram showing how to proceed a preliminary evaluation process by using a time-sharing method.

The preliminary evaluation processes the steps 2 to 6 are executed with all of the individuals by the time sharing method. Specifically, as seen in FIG. 17, the air fuel ratio control is executed with every individual for one minute and, as such that this control is the unit cycle, the air fuel ratio control is continued for pre-set cycles. The preliminary evaluation value on each individual at each cycle is, for example, an amount of the consumed fuel such that when the control is executed with the very individual.

If it is determined that the preliminary evaluation processes are executed for the pre-set cycles (step 7), the total evaluation values on every individual are calculated (step 8). This calculation is carried out on every individual in such a manner that the mileage, which the vehicle travels at the preliminary evaluation process of the very individual, is divided with the total sum of the preliminary evaluation value of the individual, i.e., the total fuel consumption. If it is not determined, the program goes back to the step 2 and repeats the steps 2 to 7.

It should be noted that the evolutionary processes at steps 2 through 8 are executed autonomously, i.e., without any external operation like that which is given in the evolutionary processes of the drivability module.

It is advantageous to execute the evaluation processes on each individual of the same generation every pre-set cycle by the time sharing method as described above. Because, dispersion of evaluation caused by, for examples, differences in gear positions and in angles of hills that the vehicle climbing can be leveled off and thus the performance of all individuals can be impartially evaluated.

After completion of the evolutionary processes steps 2 through 8, in a similar manner with the drivability module, parent individuals are selected and individuals of the next generation are created (steps 10 and 11). Then, the same evolutionary processes are executed on the individuals that belong to the newly created generation.

The evolutionary processes described above are repeatedly executed until the individuals of all predetermined generations are evolved and evaluated. Through these processes, offspring individuals of respective generations are screened by the evaluation of the evaluation section, i.e., based upon each performance of fuel consumption (fuel efficiency), and create the next generation. Accordingly, the relationship between the input and output of the fuel efficiency module is evolving gradually so that the fuel efficiency is improved.

When the evolutionary processes are completed with all predetermined generations, an elite is selected from the ten individuals at the last generation (step 12). The coupling coefficients of the neural network of the fuel efficiency module is fixed at the genes possessed by the most adaptable individual (step 13) and the program goes to the learning processes of an learning control module in the learning hierarchy.

Figure 18:
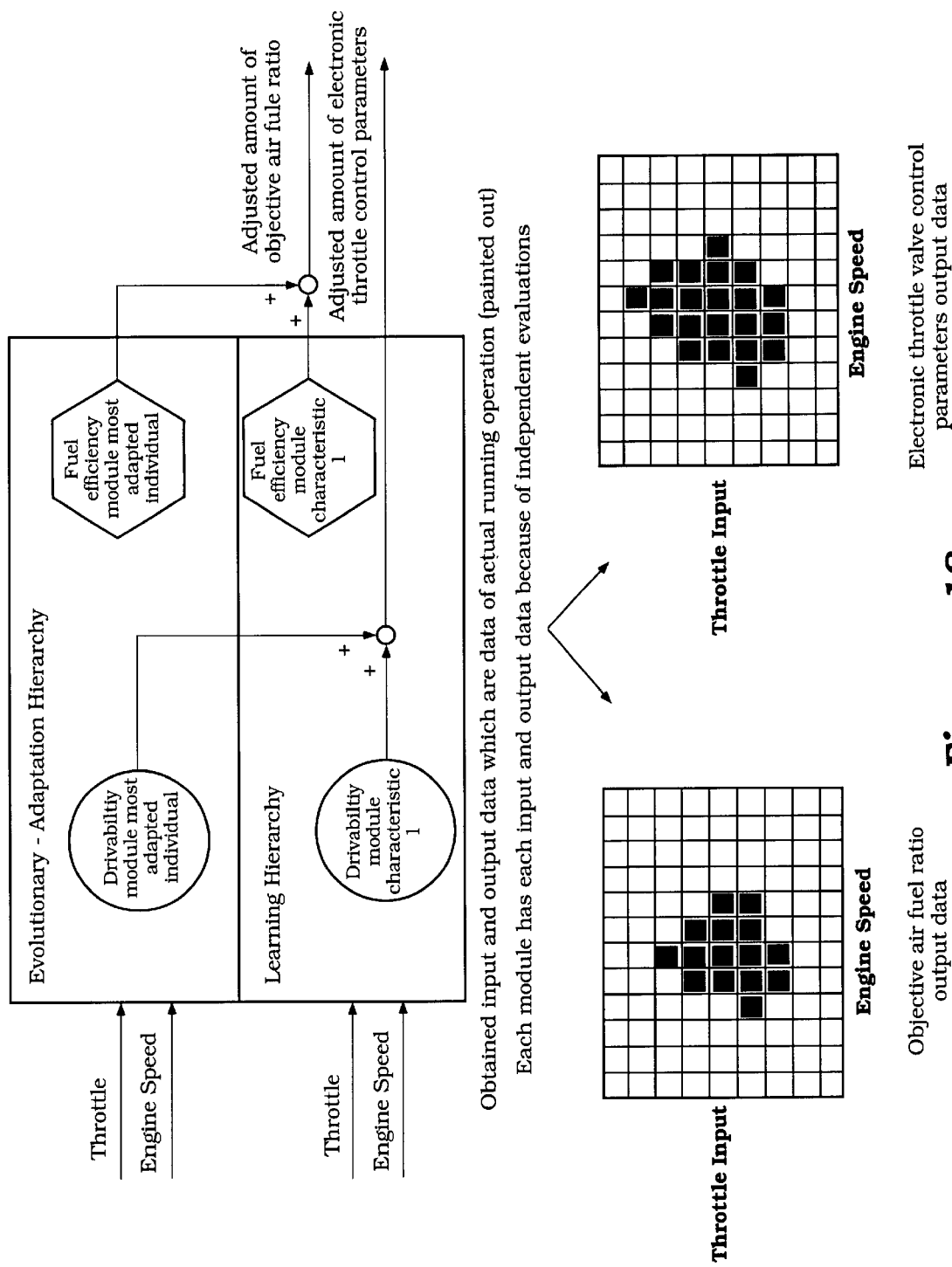
FIG. 18 is a block diagram showing schematically how to obtain educator data that are learned with the drivability module and the fuel efficiency module in a leaning hierarchy.
Figure 19:
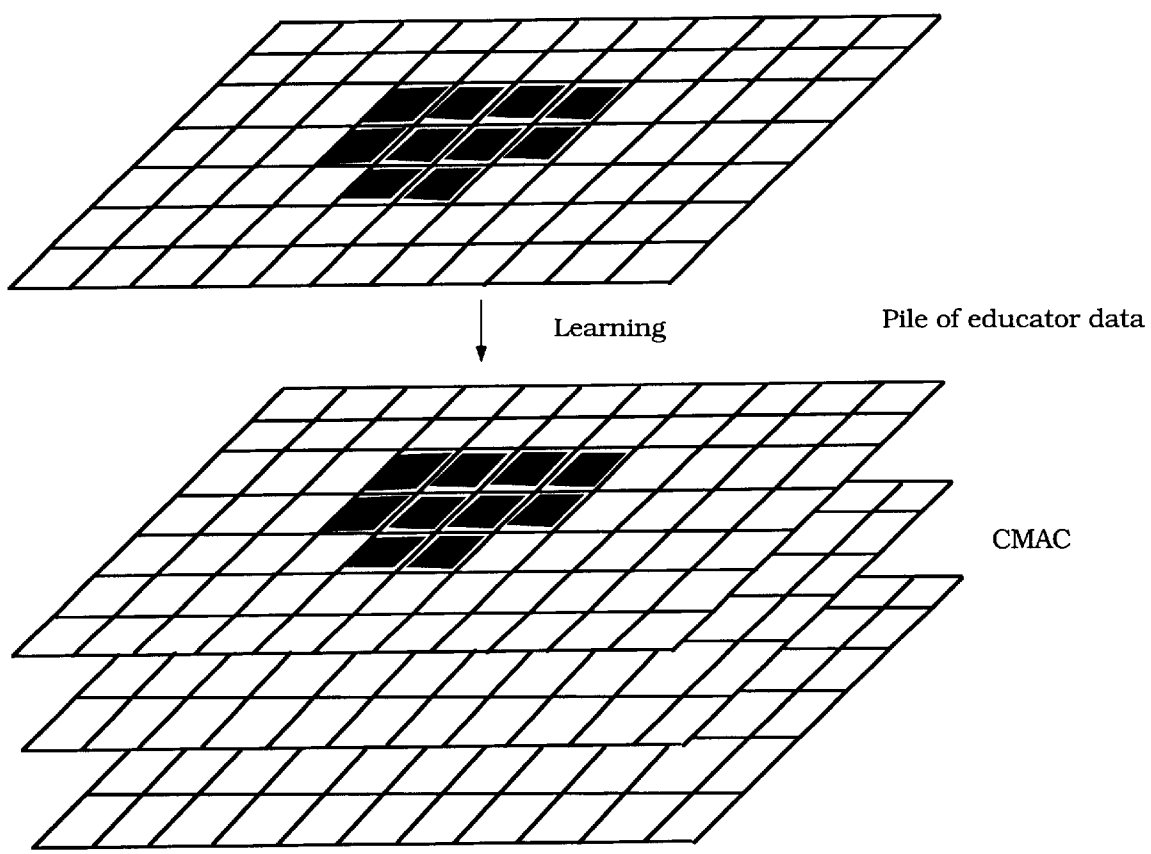
FIG. 19 is a schematic diagram showing a learning process in the learning hierarchy by CMAC (Cerebeller Model Arithmetic Computer) using renewed educator data.

Learning Hierarchy Applied to Engine Control (FIGS. 7, 18 and 19)

The learning hierarchy will now be described hereunder.

The learning hierarchy learns the outputs (the adjusted amounts of the electronic throttle control parameters and the adjusted amount of the target air fuel ratio, in this embodiment) of the respective control modules that are obtained through the evolutionary processes in the evolutionary-adaptation hierarchy and reflects them in the reflection hierarchy even after the completion of the evolutionary processes.

If the outputs of the respective control modules in the evolutionary-adaptation hierarchy were not information depending on operational conditions of the vehicle, i.e., there were no information associated with the operational conditions of the vehicle, outputs of the learning hierarchy might be the values that are made from the output of the learning hierarchy per se by merely adding the outputs of the evolutionary-adaptation hierarchy. However, if it is the case, i.e., there is information associated with the operational conditions of the vehicle, the learning hierarchy needs to learn the relationship between the operational conditions of the vehicle and the outputs from the evolutionary-adaptation hierarchy as well as the values. Thus, the learning hierarchy has a control module for learning and another control module for execution.

In this embodiment, both of the drivability module and the fuel efficiency module of the evolutionary-adaptation hierarchy are constructed with the neural networks that accept engine speed information which is one of the operational conditions of the vehicle. Because of this, the learning hierarchy must have both of the control modules as noted above. Accordingly, the learning hierarchy, as seen in FIG. 7, is not only equipped with control modules corresponding to the respective control modules in the evolutionary-adaptation hierarchy but also a learning unit and an execution unit as portions of each control module. More specifically, although not shown, each control module is composed of a pair of module units, one of which is the learning unit (hereunder referred to as "learning unit" or "learning module", occasionally) and the other is the execution unit (hereunder referred to as "execution unit" or "execution module", occasionally). Both units are interchangeable in function so that when one unit works as the learning unit the other one works as the execution unit and vice versa. Also, both units are only required to be a module that can learn and, for instance, a neural network and CMAC are applicable.

When, as the result of the evolutionary processes, the coupling coefficients of the neural networks of the respective control modules in the evolutionary-adaptation hierarchy are fixed with the most adaptable values at the point of time, as shown in FIG. 18, the respective control modules of the learning hierarchy obtain educator data that are the relationship between the outputs and inputs of the control modules in the evolutionary-adaptation hierarchy as well as the relationship between the outputs and inputs of the control modules that are in operation as the execution modules in the learning hierarchy.

Once obtaining the educator data, the respective control modules of the learning hierarchy start learning based upon the educator data. After completion of learning, the learning module is replaced by the execution module and the outputs of the respective control modules in the evolutionary-adaptation hierarchy are set as zero or the next outputs of evolutionary processes.

During the time the learning module is learning, the respective control modules in the evolutionary-adaptation hierarchy continue to supply adjusted amounts of the electronic throttle control parameters and adjusted amounts of the target air fuel ratio. The adjusted amounts, which are made as these outputs from the control modules of the evolutionary-adaptation hierarchy are added up with the outputs from the execution module of the learning hierarchy, are employed for control in the reflection hierarchy. An initial value of each execution module in the learning hierarchy is set so that the output is always zero. This setting allows the control, in the reflection hierarchy, using only the outputs from the control modules of the evolutionary-adaptation hierarchy.

As described above, the results learned by the learning hierarchy can be memorized in internal or external memories. The user, accordingly, may call the memorized characteristics back and run the vehicle with the characteristics. This brings in an advantage that the vehicle can be controlled in response to any changes of mental state of the user.

If the control modules of the learning hierarchy are neural networks, ordinary learning method is employed. If, however, they are composed of CMAC, selective learning of a portion corresponding to the newly obtained educator data is practicable so as to result in more efficient learning as shown in FIG. 19.

Figure 20:
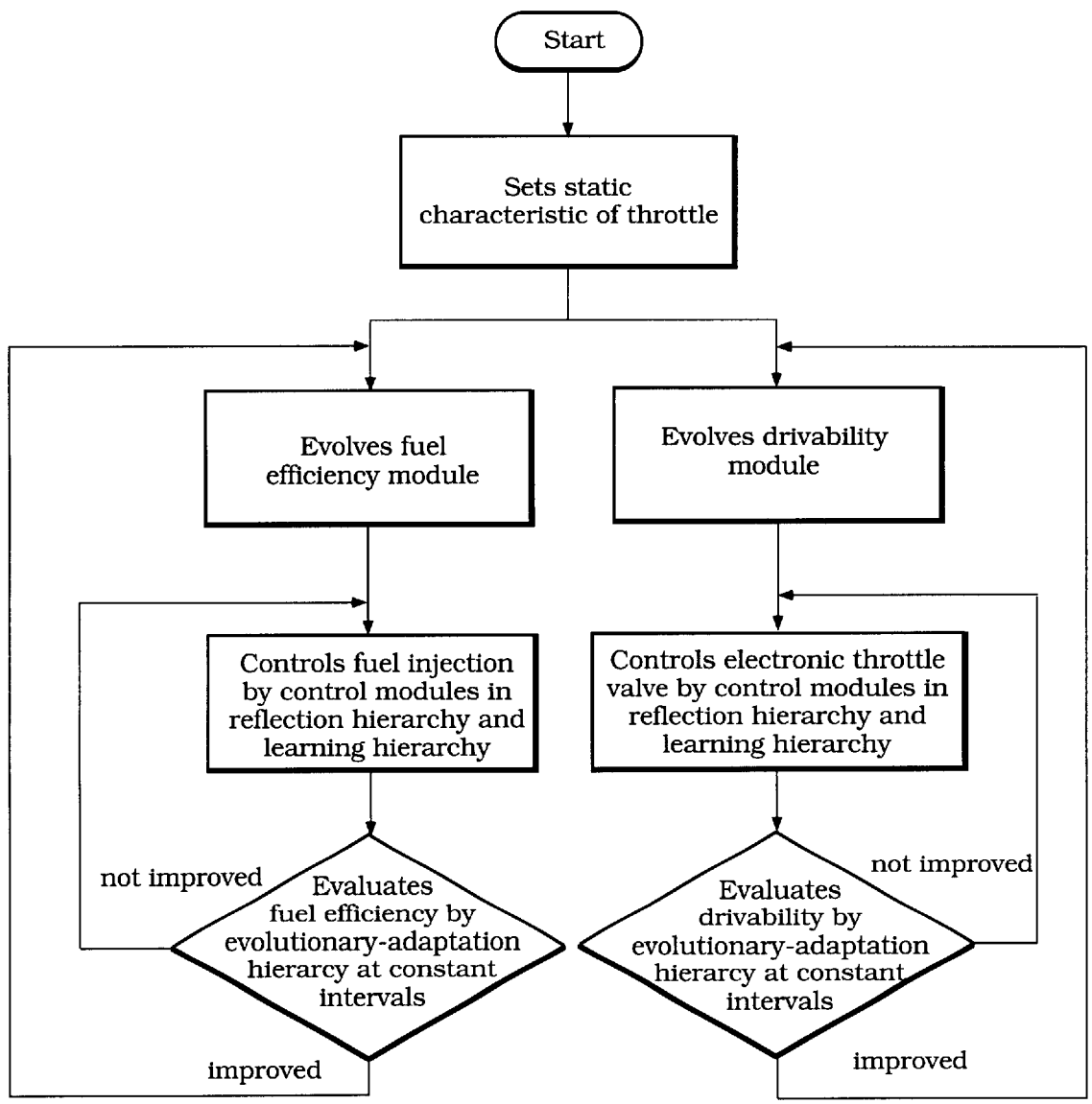
FIG. 20 is a flow chart showing the total control flow of parallel evolutionary processes performed in the evolutionary-adaptation hierarchy and the learning hierarchy.

Integrated Control (FIG. 20)

The evolutionary and learning processes on the drivability module and the fuel efficiency module proceed parallelly. FIG. 20 illustrates a flow chart to show these parallel flows of the evolutionary and learning processes.

As seen in FIG. 20, first of all, a static characteristic of the throttle, i.e., an operational amount of the accelerator, for the drivability module is set (see FIG. 8). Then, the evolutionary and learning processes of the drivability module and the fuel efficiency module parallelly proceed and, after completion of these processes, the respective control modules in the reflection hierarchy and the learning hierarchy control the drivability and the fuel efficiency, respectively. Even after the completion of them, the evolutionary processes in the evolutionary-adaptation hierarchy are executed at constant intervals. Then, the evolutionary and learning processes will be executed again on the control module(s) that is (are) improved as the result of the evolutionary processes.

As described above, when the evolutionary processes of respective control modules in the evolutionary-adaptation hierarchy are executed parallelly, each evolution of these modules does not affect to each other. Accordingly, improvements in performance in this evolution manner can diversify.

In addition, it is practicable to form the evolutionary-adaptation hierarchy so as to cease the processes, when the user calls back the coupling coefficients reserved in the external memory, with the outputs of the evolutionary-adaptation hierarchy being fixed without checking of changes in control strategy and then re-start the evolutionary processes in the evolutionary-adaptation hierarchy in response to the instruction given by the user that indicates a re-start of the processes.

As aforedescribed, screening of the individuals on the drivability module that evolve performance of the intake air amount control measure, i.e., drivability, is executed in response to the instructions given by the user (interactive evolution). Meanwhile, screening of the individuals on the fuel efficiency module that evolve performance of the air fuel ratio control measure, i.e., fuel efficiency, is executed based upon information of the fuel efficiency that is the most adaptable to actual running of the vehicle (autonomous evolution). That is, the engine integratively or synthetically evolves so as to bring in the optimal fuel efficiency under the condition such that the drivability, which the user seeks for, must be obtained. Also, this system can provide the user with much fun to evolve the engine by himself (or herself through intervention to evaluations.

Figure 21:
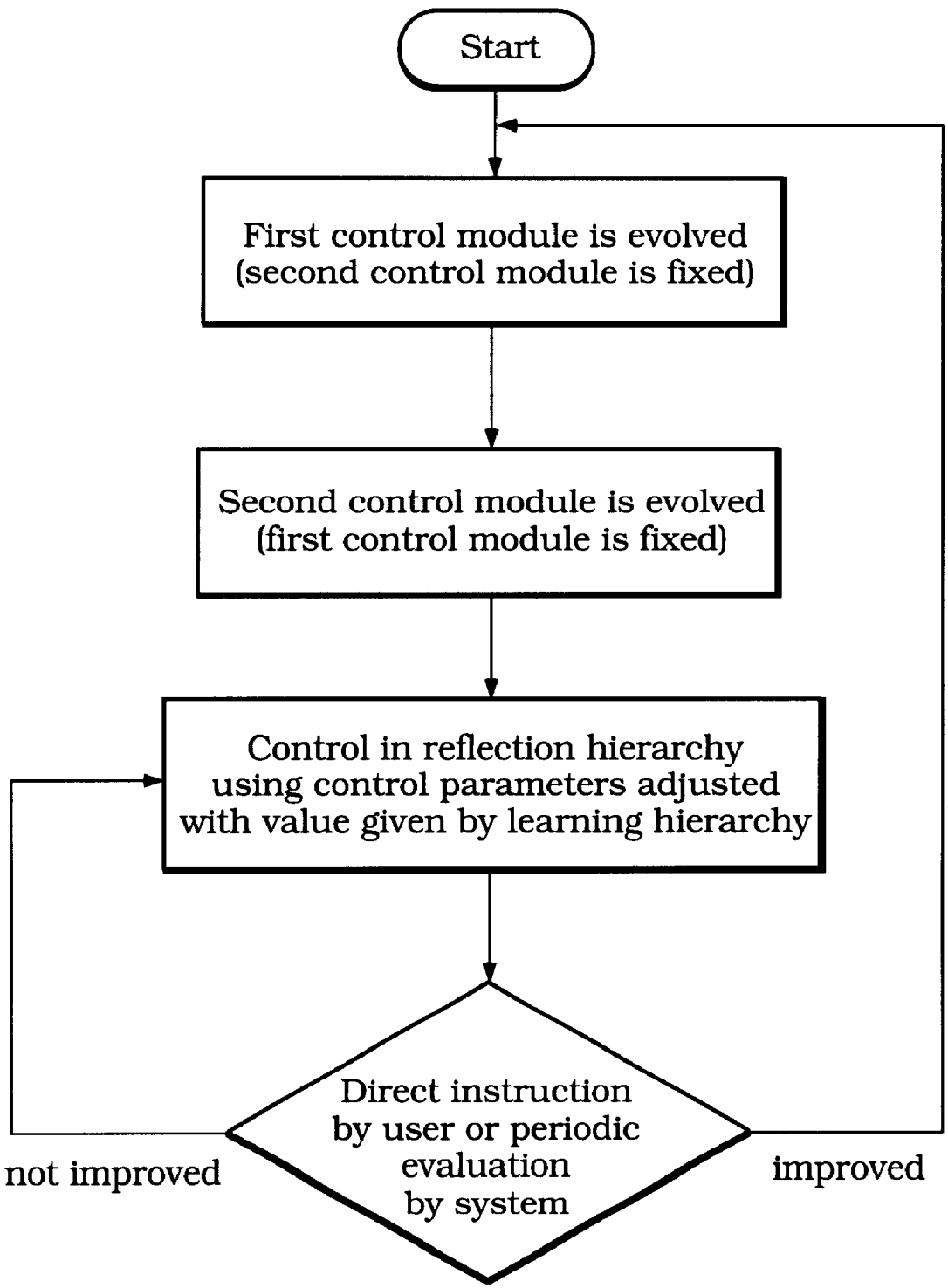
FIG. 21 is a flow chart showing the total control flow of serial evolutionary processes performed in the evolutionary-adaptation hierarchy and the learning hierarchy.

Alternatives (without drawings except FIG. 21)

In the embodiment of this invention primarily described above, a static characteristic of the throttle, i.e., operational amounts of the accelerator, (FIG. 9) is given previously by the user so that only a dynamic characteristic of the same is evolved. However, this invention may be also embodied as such that the evolutionary-adaptation hierarchy has a control module unifying the static characteristic and the dynamic characteristic and evolve their combinations including each characteristic per se. Otherwise, it is also applicable to prepare a couple of control modules each corresponding to the static characteristic and the dynamic characteristic independently in the evolutionary-adaptation hierarchy and both of them are independently evolved. In the latter one, the evolutionary processes can be executed parallelly or serially. If the processes are executed serially, either one of the characteristics, preferably the static characteristic, is evolved earlier and then the other characteristic is evolved under the condition that the previously evolved characteristic is fixed.

Also, in the embodiment of this invention primarily described above, the evolutionary result of the fuel efficiency module in the evolutionary-adaptation hierarchy that figures out the target amount of air fuel ratio is evaluated based upon fuel efficiency and the evolutionary result of the drivability module in the same hierarchy that figures out the adjusted amount of the electronic throttle control parameters is evaluated based upon an instruction given by the user. However, this invention allows providing other evaluation strategies. For instance, the evolutionary result of the drivability module is evaluated based upon fuel efficiency and the evolutionary result of the fuel efficiency module is evaluated based upon an instruction given by the user. According to this modified embodiment, the A/F control module, which has the evolved result, can provide highly efficient control of the electronic throttle valve that scarcely generates lean spikes. On the other hand, the A/F control module, which has also the revolved result, can provide air fuel ratio that is adapted to the user's preference. For instance, if the user prefers the drivability, the A/F control module provides an air fuel ratio that realizes powerful running.

Further, in the embodiment of this invention primarily described above, the evolutionary processes and the learning processes of the drivability module and the fuel efficiency module in the evolutionary-adaptation hierarchy and in the learning hierarchy are executed parallelly (FIG. 20). It is, however, practicable that the evolutionary processes and the learning processes are executed serially as shown in FIG. 21. In this alternative, during either one of the control modules is in evolutionary processes or learning processes, the other module is not in evolutionary processes and its coupling coefficients are fixed. The evolutionary processes and the learning processes are, then, executed alternately. According to this embodiment and by fixing the coupling coefficients of the control module that is not in evolutionary processes, each evolutionary result of the control modules is reflected to each other during evolutionary processes and hence both of the control modules can evolve harmoniously with each other.

Also, it can be still another alternative that the aforedescribed evolutionary processes of the control modules in the evolutionary-adaptation hierarchy are selectively executed, i.e., only with one of the modules when the user indicates to evolve it. This results in a relatively prompt evolution that leads performance of the vehicle to the user's preference quickly even though the preference is eccentric.

Further, in the embodiment of this invention primarily described above, the control modules in the reflection hierarchy are specifically the intake air charge control module and the A/F control module. The drivability module and the fuel efficiency module corresponding to the respective modules are also provided in the evolutionary-adaptation hierarchy and the learning hierarchy. However, this invention may be also embodied as follows. If, for instance, the engine is provided with an intake passage that has a variable length, another control module for controlling the intake passage length is added without making any changes on the existing modules.

Furthermore, in the embodiment of this invention primarily described above, the evolutionary processes of the control modules in the evolutionary-adaptation hierarchy are executed based upon the drivability requirement, which is indicated by the user, and the fuel efficiency suitable to the drivability. However, other evaluation criteria can be applicable as long as depending on types of employed control modules and the directions of their evolutions.

Still further, in the embodiment of this invention primarily described above, the evolutionary processes with respective control modules are brought to end with the completion of evolution through predetermined numbers of generations. However, determination of end of the evolutionary processes can, for example, depend on convergence of evolution.

It should be noted that, although the vehicle or engine control is described above, this invention is broadly applicable on any systems that need integrated control.

Advantages

There are many advantages that afforded by this invention. Some of them will be described hereunder.

In accordance with one feature of this invention, an integrated control system is provided wherein characteristics of the final controlled subject is controlled through controls of a plurality of controlled subjects that is included in the final controlled subject and have relevance to each other. Each controlled subject is provided with a control module that controls the controlled subject per se. A control parameter relating to an input and an output of the control module is evolved under genetic algorithm so as to be adapted to at least one of a predetermined characteristic that is a target of the final controlled subject, a characteristic of the user who uses the final controlled subject, a using condition and an environmental condition.

This feature brings in prompt determination of the optimal value of the control parameter. Also, this feature no longer require such a mass experimental data that obtained through experiments which need much labor, time and expense even if the final controlled subject has non-linear characteristic.

It is another feature that, during evolutionary process is executed on one control module, a parameter of the other control module is fixed. Because of this feature, directions of evolution of the control modules can be limited to some degree and thus the optimal value of the parameter is again promptly obtained.

Also, a further feature associated with parallel proceeding evolution of a plurality of control modules provides diversity of the evolution.

It is still another feature that evolution of each control module is continued until its conversion. Accordingly, after completion of the evolution on both of the control modules, the optimal value of the control parameter at the very point of time is always available.

It is yet further feature that evolution is executed through predetermined numbers of generations. This feature ceases evolution of the respective control modules in short time and eventually save whole time of evolution. Thus, the result of the evolution can be reflected on the final controlled subject rapidly.

If the final controlled subject is an engine, a specific feature is provided that a control parameter of a control module, which controls an intake air charge amount operational measure in response to an operational amount of an accelerator, is evolved under genetic algorithm. Because of this feature, lean spikes of the intake air fuel ratio are reduced so that fuel efficiency and exhaust emission are improved. In addition, running characteristics of the vehicle can be adjustable so as to be adapted to preference of the driver. Also, time for obtaining the optimal control parameters in conventional method is no longer necessary and then a large amount of cost for development of the vehicle can be saved.

Further, other specific features are provided in connection with an engine. In one feature, a static characteristic of the intake air charge amount operational measure is varied in response to the operational amount of an accelerator so that running characteristic under a cruising condition of the vehicle is also variable. In another feature, a dynamic characteristic of the same is varied in response to the operational amount of an accelerator so that a transitional characteristic of the vehicle is also variable.

Various Aspects of the Invention

As described above, this invention includes various aspects as follows:

1) An integrated control system for controlling the final subject by controlling a plurality of subordinate subjects being included in the final subject comprising a plurality of control modules controlling the respective subordinate subjects, each control module being associated with at least one parameter for controlling each of the subordinate subjects and the parameter being evolved under genetic algorithm so as to be adapted to at least one of a characteristic that is a target of the final subject, a characteristic of a user that uses the final subject, a using condition and an environmental condition of the final subject.

2) In the item 1), the respective parameters of the control modules are evolved parallelly.

3) In the item 1), the respective parameters of the control modules are evolved serially.

4) In the item 3), when the parameter associated with one of the control modules is evolved the other parameters associated with the other control modules are not evolved.

5) In the item 3), the respective parameters of the control modules are evolved through all of predetermined generations.

6) In the item 3), the respective parameters of the control modules are evolved until convergence of the evolution.

7) In the item 1), the respective parameters of the control modules are evolved by means of a control device having at least an evolutionary-adaptation hierarchy.

8) In the item 7), the evolutionary-adaptation hierarchy comprises an evolution section that evolves the parameters of the control modules and an evaluation section that evaluates a result of the evolution.

9) In the item 8), the evolutionary-adaptation hierarchy is operated at times so as to evaluate performance of the control modules.

10) In the item 8), a control module is evolved again if its performance is improved.

11) In the item 8), the evaluation section evaluates a result of the evolution by time sharing method.

12) In the item 7), the control device further comprises a reflection hierarchy that controls the final subject by means of a result of the evolutionary-adaptation hierarchy.

13) In the item 12), the control device further comprises a learning hierarchy that learns the result of the evolutionary-adaptation hierarchy and adds a leaned result onto the result of the evolutionary-adaptation hierarchy.

14) In the item 13), the learning hierarchy has a learning unit and an execution unit, both units are interchangeable, and when the learning unit is under learning the execution unit controls the final object.

15) In the item 1), the respective control modules are inputted with information relative to at least one of the predetermined characteristic that is a target of the final subject, the characteristic of the user, the using condition and the environmental condition of the final subject and then output information relative to an evolved value of the parameter.

16) In the item 1), the characteristic of the user includes at least one of preference, skill and feeling of the user.

17) In the item 16), the system further comprises an input device that is operable by the user and the preference of the user is given by means of the input device.

18) In the item 16), the preference of the user is determined by duration in which the user operates the input device.

19) In the item 1), the system further comprises an input device that is operable by the user and the user evaluates a result of the evolution by operating the input device.

20) In the item 1), the using condition includes at least one of elapsed deterioration and frequency of use.

21) In the item 1), the final subject is an internal combustion engine, the engine has an air intake device through which air charge is induced for combustion, means for directly controlling an amount of the intake air charge located in the air intake device for admitting certain amount of the intake air charge to pass and an accelerator for determining an operational amount of the means for directly controlling an amount of the intake air charge, at least one of the subordinate subjects is the means for directly controlling an amount of the intake air charge, at least one of the control modules is a control module that controls the means for directly controlling an amount of the intake air charge, and the control module is inputted with at least information relative to the operational amount of the accelerator and then outputs information relative to the directly control amount of the means for controlling an amount of the intake air charge.

22) In the item 21), the intake air charge amount control means has at least a static characteristic relative to the operational amount of the accelerator and the parameter of the control module that controls the amount of the intake air charge includes a parameter that exerts an influence on the static characteristic.

23) In the item 21), the intake air charge amount control means has at least a dynamic characteristic relative to the operational amount of the accelerator and the parameter of the control module that controls the amount of the intake air charge includes a parameter that exerts an influence on the dynamic characteristic.

24) In the item 23), the parameter that exerts an influence on the dynamic characteristic is at least one of a time constant of primary lag, an adjusted coefficient of acceleration, a differentiation time and a differentiation gain each relative to the operational amount of the accelerator.

25) In the item 1), the final subject is an internal combustion engine having an fuel injection device for injecting a certain amount of fuel for combustion, at least one of the subordinate subjects is the fuel injection device, at least one of the control modules is a control module that controls the amount of injected fuel from the fuel injection device, and the control module is inputted with at least information relative to an operational condition of the engine and then outputs information relative to the amount of injected fuel from the fuel injection device.

26) In the item 25), the parameter of the control module that controls the amount of injected fuel includes a target air fuel ratio.

27) In the item 1), a result of evolution is partly evaluated by the user and partly evaluated by the control system per se.

28) A method for integratively controlling a final subject with a control device by controlling a plurality of subordinate subjects being included in the final subject, the control device having a plurality of control modules controlling each of the respective subordinate subjects, each control module being associated with at least one parameter for controlling the subordinate subjects, the method comprising the step of evolving the parameter under genetic algorithm so as to adapt it to at least one of a predetermined characteristic that is a target of the final subject, a characteristic of the user that uses the final subject, a using condition and an environmental condition of the final subject.

29) In the item 28), the step of evolving proceeds parallelly with regard to the respective parameters of the control modules.

30) In the item 28), the step of evolving proceeds serially with regard to the respective parameters of the control modules.

31) In the item 30), when the step of evolving proceeds with regard to the parameter associated with one of the control modules the other step of evolving does not proceed with regard to the other parameters associated with the other control modules.

32) In the item 30), the step of evolving proceeds with regard to the respective parameters of the control modules through all of predetermined generations.

33) In the item 30), the step of evolving proceeds with regard to the respective parameters of the control modules until convergence of the evolution.

34) In the item 28), the method further comprises the step of evaluating a result of the step of evolving.

35) In the item 34), the method further comprises the step of evaluating performance of the control modules at times.

36) In the item 34), the method further comprises the step of evaluating performance of the control module whether it is improved and the step of evolving again the control module that is improved.

37) In the item 34), the step of evaluating is done by time sharing method.

38) In the item 34), the method further comprises the step of controlling the final subject by means of a result of the step of evolving.

39) In the item 38), the method further comprises the steps of learning the result of the evolving and adding a leaned result onto the result of the step of evolving.

40) In the item 39), the learning hierarchy has a learning unit and an execution unit, both units are interchangeable, and the method further comprises the step of executing control of the final subject by the execution unit when the learning step is done by the learning unit.

41) In the item 28), the method further comprises the steps of inputting information relative to at least one of the predetermined characteristic that is a target of the final subject, the characteristic of the user, a using condition and the environmental condition of the final subject to the respective control modules and outputting information relative to an evolved value of the parameter.

42) In the item 28), the characteristic of the user includes at least one of preference, skill and feeling of the user.

43) In the item 42), the control device further comprises an input device that is operable by the user and the method further comprises the step of giving the preference of the user by means of the input device.

44) In the item 42), the preference of the user is determined by duration in which the user operates the input device.

45) In the item 28), the control device further comprises an input device that is operable by the user and the method further comprises the step of evaluating in which the user evaluates a result of the step of evolving by operating the input device.

46) In the item 28), the using condition includes at least one of elapsed deterioration and frequency of use.

47) In the item 28), the final subject is an internal combustion engine, the engine has an air intake device through which air charge is induced for combustion, means for directly controlling an amount of the intake air charge located in the air intake device for admitting certain amount of the intake air charge to pass and an accelerator for determining an operational amount of the means for directly controlling an amount of the intake air charge, at least one of the subordinate subjects is the means for directly controlling an amount of the intake air charge, at least one of the control modules is a control module that controls the means for directly controlling an amount of the intake air charge, and the method further comprises the steps of inputting at least information relative to the operational amount of the accelerator to the control module and outputting information relative to the directly control amount of the means for controlling an amount of the intake air charge.

48) In the item 47), the intake air charge amount control means has at least a static characteristic relative to the operational amount of the accelerator and the parameter of the control module that controls the amount of the intake air charge includes a parameter that exerts an influence on the static characteristic.

49) In the item 47), the intake air charge amount control means has at least a dynamic characteristic relative to the operational amount of the accelerator and the parameter of the control module that controls the amount of the intake air charge includes a parameter that exerts an influence on the dynamic characteristic.

50) In the item 49), the parameter that exerts an influence on the dynamic characteristic is at least one of a time constant of primary lag, an adjusted coefficient of acceleration, a differentiation time and a differentiation gain each relative to the operational amount of the accelerator.

51) In the item 47), the final subject is an internal combustion engine having an fuel injection device for injecting a certain amount of fuel for combustion, at least one of the subordinate subjects is the fuel injection device, at least one of the control modules is a control module that controls the amount of injected fuel from the fuel injection device, and the method further comprises the steps of inputting at least information relative to an operational condition of the engine to the control module and outputting information relative to the amount of injected fuel from the fuel injection device.

52) In the item 51), the parameter of the control module that controls the amount of injected fuel includes a target air fuel ratio.

53) In the item 28), the method further comprises the step of evaluating a result of step of evolving, partly by the user and partly by the control system per se.

As mentioned above, genetic algorithms are well known in the art. For example, Da Ruan (editor) "Intelligent Hybrid Systems—Fuzzy Logic, Neural Networks, and Genetic Algorithms —" Kluwer Academic Publishers (1997), J.-S. R. Jang, C.-T. Sun, E. Mizutani,"Neuro-Fuzzy and Soft Computing" Prentice Hall Upper Saddle River, N.J. 07458 (1997), C.-T. Lin and C. S. George Lee, "Neural Fuzzy Systems" Prentice Hall Upper Saddle River, N.J. 07458 (1998), and N. K. Kasabov, "Foundations of Neural Networks, Fuzzy Systems, and Knowledge Engineering" the MIT Press (1996) can be refer Of course, the foregoing description is that of preferred embodiments of the invention, and various changes and modifications may be made without departing from the spirit and scope of the invention, as defined by the appended claims.

What is claimed is:

1. A control system for controlling performance of a machine used by a user, which machine is operable by causative signals, the performance of which machine is indicatable by indicative signals, said control system comprising:
control modules programmed to output the causative signals when receiving pre-selected signals, wherein an input-output relationship of each control module is regulated by at least one control parameter;
processing units programmed to output at least one control parameter to the respective control modules when receiving indicative signals from the machine, wherein the input-output relationship of each processing unit is regulated by coefficients;
selection-signal generation units programmed to output selection signals when receiving interaction signals from the user and/or pre-set target values; and
genetic algorithm units programmed to select fitted coefficients based on the selection signals when using as genes the coefficients from the respective processing units, wherein the selected fitted coefficients replace the coefficients used in the respective processing units to update the input-output relationships of the respective processing units, thereby updating the input-output relationships of the respective control modules.

2. The control system according to claim 1, wherein the control modules are grouped into interaction control modules and autonomous control modules, said interaction control modules receiving outputs from the respective processing units which use coefficients selected by the respective genetic algorithm units based on the selection signals derived from the interaction signals from the user, said autonomous control modules receiving outputs from the respective processing units which use coefficients selected by the respective genetic algorithm units based on the selection signals derived from the pre-set target values.

3. The controls system according to claim 1, wherein the processing units include neural networks programmed to output the control parameters when receiving the indicative signals, the input-output relationships of which neural networks are regulated by coupling coefficients, said coupling coefficients being used as genes at the genetic algorithm units.

4. The control system according to claim 1, wherein the control modules constitute an evolution layer, and the control system further comprises a base layer downstream of the evolution layer and upstream of the machine, said base layer calculating and adding base values of the causative signals to the outputs from the control modules of the evolution layer, based on pre-selected signals.

5. The control system according to claim 4, further comprising a learning layer between the evolution layer and the base layer, said learning layer having a learning function which copies the input-output relationship of each control module and outputs causative signals to the base layer.

6. A control system for controlling performance of a machine used by a user, which machine is operable by causative signals outputted from control modules when the control modules receive pre-selected signals, the performance of which machine is indicatable by indicative signals, wherein an input-output relationship of each control module is regulated by at least one control parameter, said control system comprising:
processing units programmed to output at least one control parameter to the respective control modules when receiving indicative signals from the machine, wherein the input-output relationship of each processing unit is regulated by coefficients;
selection-signal generation units programmed to output selection signals when receiving interaction signals from the user and/or pre-set target values; and
genetic algorithm units programmed to select fitted coefficients based on the selection signals when using as genes the coefficients from the respective processing units, wherein the selected fitted coefficients replace the coefficients used in the respective processing units to update the input-output relationships of the respective processing units, thereby updating the input-output relationships of the respective control modules.

* * * * *